(12) United States Patent  (10) Patent No.: US 8,899,409 B2
Lasecki  (45) Date of Patent: Dec. 2, 2014

(54) CONVEYOR BELT LINK HAVING WEAR RESISTANT PORTION

(75) Inventor: Jonathan R. Lasecki, Strasburg, VA (US)

(73) Assignee: Ashworth Bros., Inc., Fall River, MA (US)

( * ) Notice: Subject to any disclaimer, the term of this patent is extended or adjusted under 35 U.S.C. 154(b) by 281 days.

(21) Appl. No.: 13/495,939

(22) Filed: Jun. 13, 2012

(65) Prior Publication Data

US 2013/0334015 A1  Dec. 19, 2013

(51) Int. Cl.
*B65G 17/06* (2006.01)
*B65G 23/06* (2006.01)
*B65G 17/40* (2006.01)

(52) U.S. Cl.
USPC ......... 198/851; 198/844.1; 198/850; 198/852

(58) Field of Classification Search
None
See application file for complete search history.

(56) References Cited

U.S. PATENT DOCUMENTS

| | | |
|---|---|---|
| 1,551,764 A | 9/1925 | Muller |
| 4,078,655 A | 3/1978 | Roinestad |
| 4,846,339 A | 7/1989 | Roinestad |
| 4,932,925 A | 6/1990 | Roinestad et al. |
| 5,121,831 A | 6/1992 | Fesler |
| 5,141,102 A | 8/1992 | Roinestad et al. |
| 5,176,248 A * | 1/1993 | Allen et al. ............... 198/850 |
| 5,439,090 A * | 8/1995 | Findlay ..................... 198/333 |
| 5,439,097 A | 8/1995 | Takahashi et al. |
| 5,701,638 A * | 12/1997 | Schick ......................... 24/33 P |
| 5,865,021 A | 2/1999 | Duerigen et al. |
| 5,954,188 A | 9/1999 | Etherington et al. |
| 6,401,914 B1 | 6/2002 | Greve |
| 6,666,013 B2 | 12/2003 | Nakagawa et al. |
| 7,063,207 B2 | 6/2006 | Sykora |
| 7,490,715 B2 | 2/2009 | Girg et al. |
| 7,735,637 B2 * | 6/2010 | Montgomery et al. ....... 198/848 |
| 7,837,029 B2 * | 11/2010 | Russell ..................... 198/851 |
| 2007/0080048 A1 | 4/2007 | Messick, Jr. et al. |
| 2007/0205085 A1 | 9/2007 | McLaughlin et al. |
| 2008/0169173 A1 | 7/2008 | Montgomery et al. |
| 2009/0294258 A1 | 12/2009 | Nakagawa et al. |
| 2010/0236902 A1 | 9/2010 | Montgomery et al. |
| 2011/0120839 A1 | 5/2011 | Russell |

FOREIGN PATENT DOCUMENTS

| | | |
|---|---|---|
| JP | 62-201706 A | 9/1987 |
| JP | 2008-232444 A | 10/2008 |

OTHER PUBLICATIONS

Notification of Transmittal of the International Search Report and The Written Opinion of the International Searching Authority mailed on Aug. 27, 2013 in connection with International Patent Application No. PCT/US2013/045349; 12 pages.

* cited by examiner

*Primary Examiner* — Kavel Singh
(74) *Attorney, Agent, or Firm* — Plumsea Law Group, LLC

(57) ABSTRACT

A conveyor belt configured to contact a drive surface is disclosed including a substantially U-shaped link having an outermost portion with a contact surface configured to face the drive surface. The outermost portion of the link may be more resistant to wear due to contact with the drive surface than other portions of the link.

49 Claims, 21 Drawing Sheets

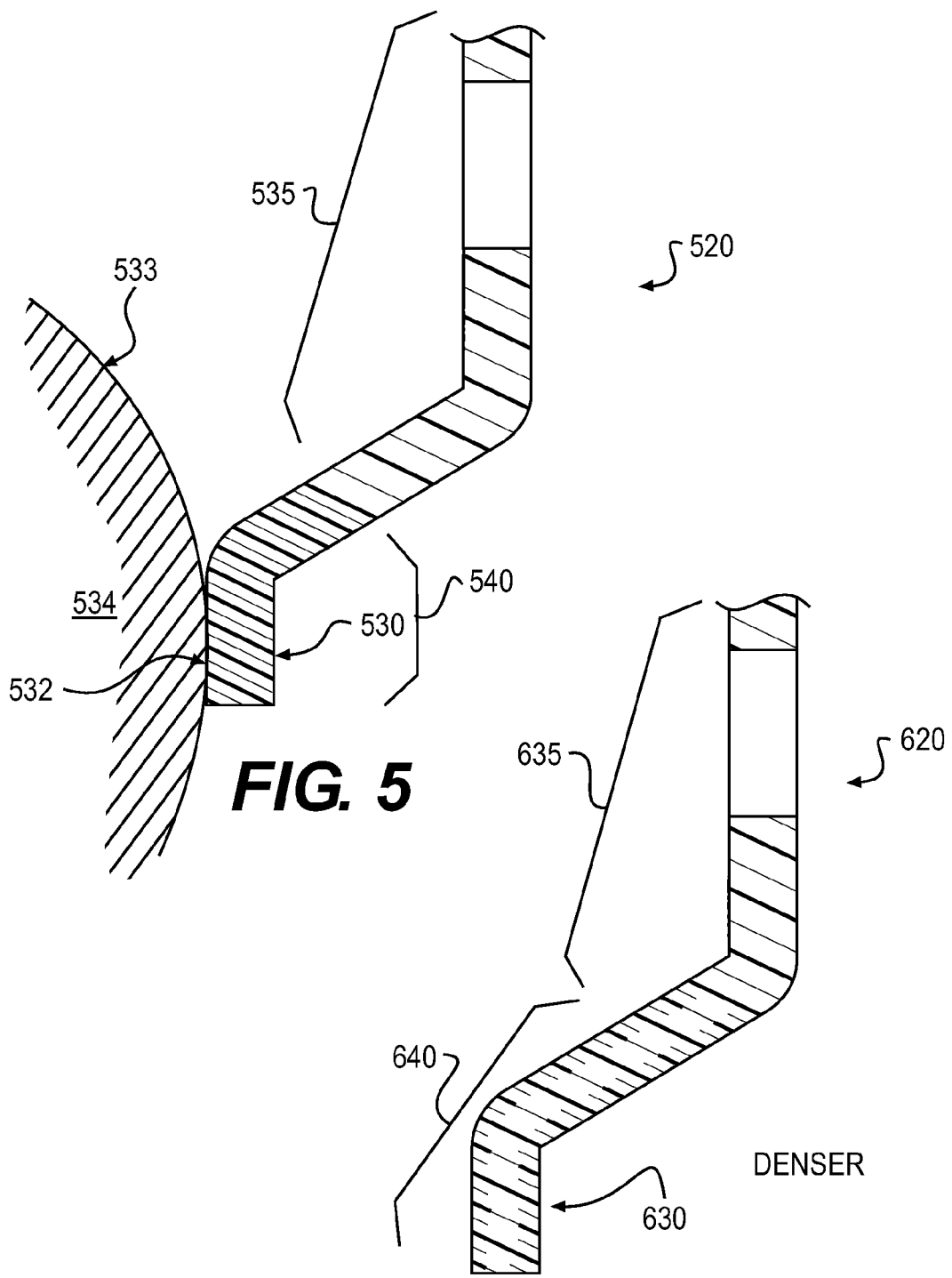

CONVEYOR BELT LINK HAVING WEAR RESISTANT PORTION

FIELD OF THE INVENTION

The present invention relates generally to conveyor belts made from a plurality of longitudinally spaced rods coupled with interlocking links. More particularly, the present invention relates to conveyor belts having links with wear resistant portions.

BACKGROUND

Conveyor belts are used in a number of different industrial fields to provide continuous motion of goods during manufacture, shipping, and other processes. Industrial conveyor belts commonly include a series of spaced apart rods connected via a series of interlocking links which are welded to the rods. In some cases, the links may be substantially U-shaped, and thus may include an inner leg, an outer leg, and a connecting portion extending between the legs at one end of the link. The rods and links of conveyor belts may be formed from metal or non-metal materials, such as plastics. For the manufacture of small items, the rods may be covered with a fabric, plastic, or metal overlay, such as a mesh, to prevent the small items from slipping between the rods and falling to the manufacturing floor.

A typical conveyor belt 10 is shown in FIG. 1, which corresponds to FIG. 1 of U.S. Pat. No. 5,954,188, which is incorporated herein by reference. Conveyor belt 10 includes rods 20 connected by links 22 covered by a mesh 14. A buttonhead 32 is formed on the ends of rods 20 to act as a stop for links 22. A weld is also typically formed between buttonhead 32 and link 22 for a stronger and more secure connection between rods 20 and links 22. Conveyor belt systems have also been developed with buttonless rods. Such buttonless systems include a relatively flat weld that sits flush with the outer surface of the link or may extend slightly from the outer surface of the link.

Conveyor belts as described above can be subject to wear due to contact with drive surfaces, which can create challenges in maintaining the conveyor belt and associated equipment. For example, if a conveyor belt is subjected to a curvy path, the conveyor belt is driven around a curve via friction between the edge of the conveyor belt and a driving belt. The driving belt includes a drive surface which frictionally grasps the sides of the links of the conveyor belt to force the conveyor belt to follow the path of the curve. With use, the outermost portions of the link that come into contact with the drive surface (usually the buttonheads, welds at the rod/link junction, and/or portions of the link legs) may become worn and/or damaged. In addition, other portions of links, such as the connecting portion between inner and outer link legs may be subject to wear.

The present disclosure is directed to improvements in wear resistance of conveyor belt components.

SUMMARY

In one aspect, the present disclosure is directed to a conveyor belt configured to contact a drive surface. The conveyor belt may include a substantially U-shaped link including an outermost portion having a contact surface configured to face the drive surface. The outermost portion of the link may be more resistant to wear due to contact with the drive surface than other portions of the link.

In another aspect, the present disclosure is directed to a conveyor belt configured to contact a drive surface. The conveyor belt may include a rod having a free end, wherein the rod comprises an elongated portion of a rod material. In addition, the conveyor belt may include a substantially U-shaped link configured to receive the rod, the link having a first leg, a second leg, and a connecting portion connecting the first leg and the second leg, wherein the connecting portion is anodized, heat treated, or formed of a different material than the first and second leg, and is more resistant to wear than the first or second leg.

In another aspect, the present disclosure is directed to a method of making a conveyor belt portion configured to contact a drive surface wear resistant. The method may include forming a substantially U-shaped link including an outermost portion having a contact surface configured to face the drive surface. In addition, the method may include rendering the outermost portion of the link more resistant to wear due to contact with the drive surface than other portions of the link.

In another aspect, the present disclosure is directed to a method of making a conveyor belt portion wear resistant. The method may include providing a rod having a free end, wherein the rod comprises an elongated portion of a rod material. In addition, the method may include forming a substantially U-shaped link configured to receive the rod, the link having a first leg, a second leg, and a connecting portion connecting the first leg and the second leg. Rendering the connecting portion of the link more resistant to wear than other portions of the link may be performed by at least one of anodizing, heat treating, or forming the connecting portion of a different material than the first and second legs.

Other systems, methods, features and advantages of the invention will be, or will become, apparent to one of ordinary skill in the art upon examination of the following figures and detailed description. It is intended that all such additional systems, methods, features and advantages be included within this description and this summary, be within the scope of the invention, and be protected by the following claims.

BRIEF DESCRIPTION OF THE DRAWINGS

The invention can be better understood with reference to the following drawings and description. The components in the figures are not necessarily to scale, emphasis instead being placed upon illustrating the principles of the invention. Moreover, in the figures, like reference numerals designate corresponding parts throughout the different views.

FIG. 5 is a close-up cross-sectional view of a portion of a conveyor belt link embodiment;

FIG. 6 is a close-up cross-sectional view of a portion of another conveyor belt link embodiment;

DETAILED DESCRIPTION

Figure 1:
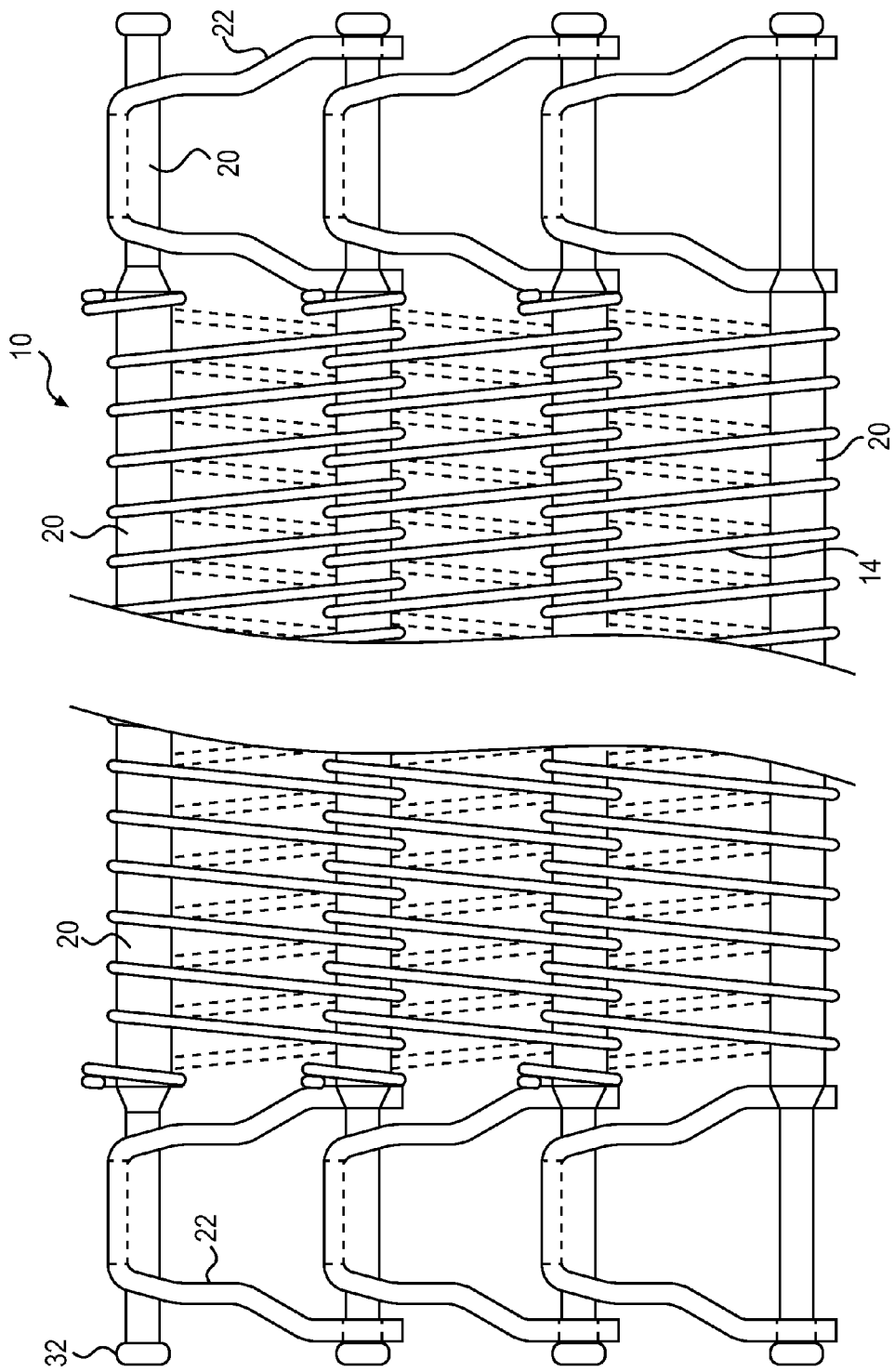
FIG. 1 illustrates an exemplary prior art conveyor belt incorporating rods with buttonheads.
Figure 2:
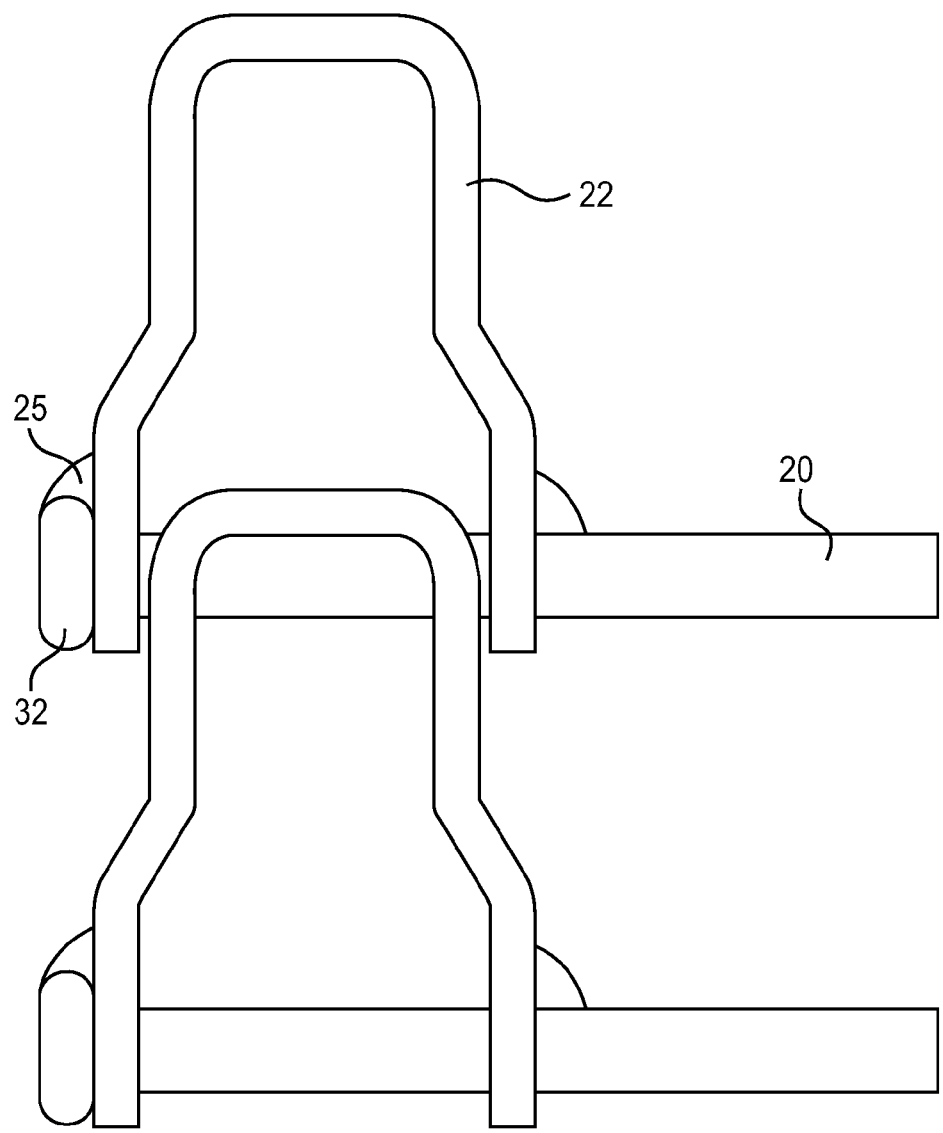
FIG. 2 illustrates an exemplary of a link of a prior art conveyor belt link on a buttonhead rod.

FIG. 1 shows a prior art conveyor belt 10 formed from rods 20 connected together with links 22 as disclosed in U.S. Pat. No. 5,954,188. A wire mesh overlay 14 covers rods 20 between links 22 to provide additional support for the goods transported on conveyor belt 10. As shown in FIG. 2, which shows an enlarged view of a portion of conveyor belt 10, rods 20 are formed with buttonheads 32. Buttonheads 32 assist in keeping links 22 in position. Rods 20 are connected to links 22 via buttonheads 32, such as with welds 25.

For purposes of this disclosure, the term "fixedly attached" shall refer to two components joined in a manner such that the components may not be readily separated (for example, without destroying one or both of the components). Exemplary modalities of fixed attachment may include joining with permanent adhesive, rivets, stitches, nails, staples, welding, brazing, soldering, other types of thermal bonding, and/or other joining techniques. In addition, two components may be "fixedly attached" by virtue of being integrally formed, for example, in a molding process.

The term "buttonhead," in the context of conveyor belts, as will be recognized by skilled artisans, refers to a bulbous protrusion at an outer end of a rod. Such a bulbous protrusion not only protrudes from the outer surface of the link, but also has a diameter that is larger than the opening in the link leg through which the rod passes to prevent the rod from coming out of place. The term "buttonless," as will also be recognized by those having ordinary skill in the art, refers to rods not having buttonheads and, more specifically, to rods that terminate at free ends that have a diameter that is substantially the same or smaller than the rest of the rod. It shall also be understood, however, that "buttonless" does not preclude the possibility that a small stepped area could overlay the link aperture so that the small stepped area is substantially co-planar with the outer link surface without being precisely flush with the outer link surface. Detailed explanations of buttonheaded and buttonless conveyor belt rods are provided in U.S. Patent Application Publication No. 2008/0169173 and U.S. Patent Application Publication No. 2010/0236902, which are incorporated herein by reference.

Figure 3A:
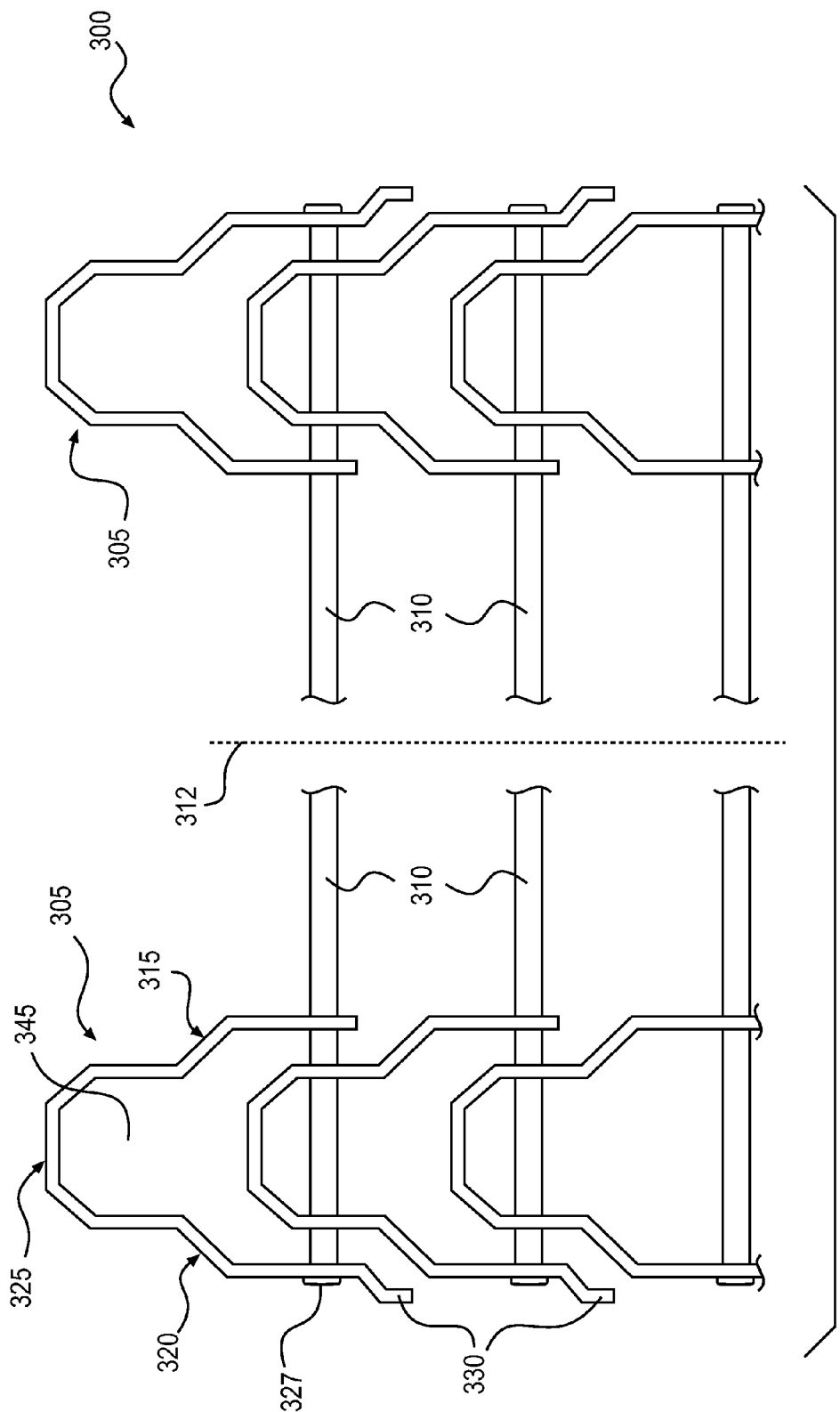
FIG. 3A is a top view of an exemplary conveyor belt embodiment.
Figure 3B:
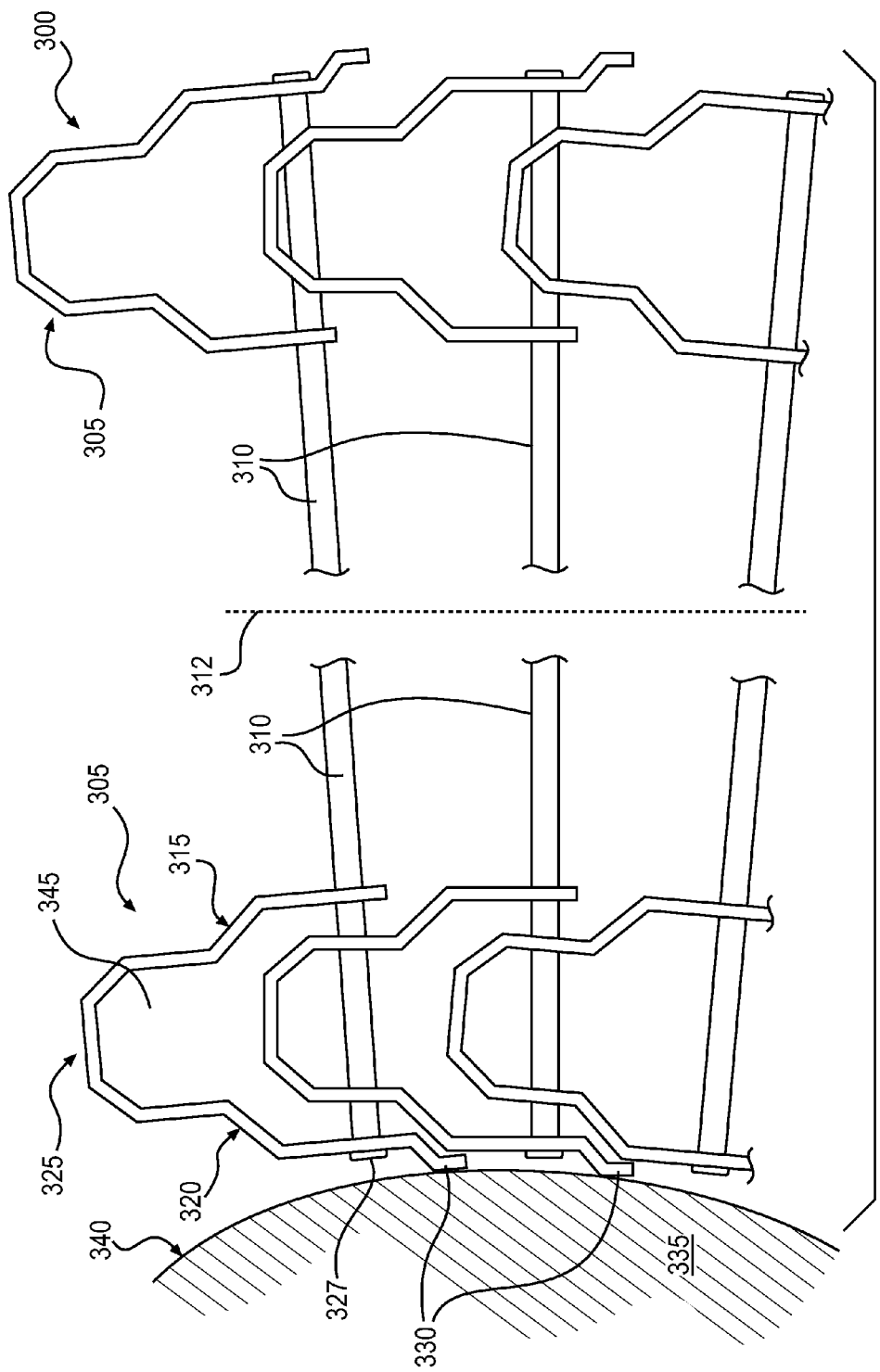
FIG. 3B is a top view of the conveyor belt in FIG. 3A with one side collapsed and abutting a drive surface of a drum.

FIGS. 3A and 3B show top views of an exemplary conveyor belt 300. As shown in FIG. 3A shows conveyor belt 300 in a substantially (but not completely) collapsed configuration. As illustrated in FIG. 3A, conveyor belt 300 may include a plurality of links 305 connected by a plurality of elongated rods 310. A center line 312 indicates the approximate midline of conveyor belt 300. Conveyor belt 300 may include outer ends disposed away from center line 312. For purposes of this disclosure, the term "outer," as used in this description and the appended claims, shall refer to a direction toward the outer ends of conveyor belt 300 and away from center line 312. Conversely, the term "inner" shall refer to a direction toward center line 312 and away from the outer ends of conveyor belt 300. In addition, for purposes of this disclosure, the term "longitudinal direction" shall refer to the direction in which center line 312 is oriented.

As shown in FIG. 3A, all of rods 310 may be substantially similar in shape and dimension, with each of rods 310 being an elongated cylindrical body formed of an elongated portion of a rod material. The inner portions of rods 310 (near center line 312) are truncated in FIG. 3A for purposes of illustration. Rods 310 may be any suitable length for supporting and carrying a variety of wares. In some embodiments, rods 310 may have a uniform or substantially uniform diameter along the length of the cylindrical body. The diameter may be selected based upon factors such as the type of goods being moved on conveyor belt 300, the width of conveyor belt 300, and/or other considerations. In some embodiments, rods 310 may include tapering or stepped configurations. In some embodiments, at least a portion of rods 310 may be a substantially hollow tube or pipe. In other embodiments, rods 310 may be solid.

Rods 310 may be made from any suitable material. For example, in some embodiments, rods 310 may be made from a metal material, such as steel, stainless steel, aluminum, titanium, and/or other metals. In other embodiments, rods 310 may be made from a non-metallic material, such as plastic, wood, carbon fiber, and/or other non-metallic materials. In some embodiments, rods 310 may be formed of a combination of materials, including, for example, combinations of metal and non-metal materials.

As shown in FIG. 3A, rods 310 may be operatively connected to each other with links 305. In some embodiments, links 305 may have a general U-shape, wherein each link 305 is constructed with two legs, including an inner leg 315 and an outer leg 320, joined by a connecting portion 325. As shown in FIG. 3A, outer ends 327 of rods 310 may be fixedly attached to outer legs 320 of links 305, for example, by welding or other type of fixation.

In some embodiments, inner leg 315 and outer leg 320 may be substantial mirror-image forms except for an additional protruding portion 330 at an end portion of outer leg 320. Accordingly, as the configuration of inner leg 315 and outer leg 320 are identical save for opposing orientation and protruding portion 330 on outer leg 320, for the sake of clarity, only the structure of outer leg 320 will be discussed with particularity in the present disclosure. It is also noted that, although the accompanying figures show and the description below refers to embodiments in which protruding portion 330 is located at a terminal end of outer leg 320, the protruding portion may be located at any suitable position along outer leg 320.

The links may be made from any of a wide variety of materials, including metals, such as steel, stainless steel, aluminum, titanium, alloys, and other metals; polymers/plastics, such as thermoplastics, vinyl, polyurethane, polyethylene, and other suitable such materials; and/or other non-metallic materials, such as graphite, carbon fiber, and other carbon-based, non-metallic materials.

FIG. 3A illustrates conveyor belt 300 in a longitudinally collapsed configuration. FIG. 3B is a top view of the conveyor belt in FIG. 3A with one side collapsed and abutting a drive surface 340 of a drum 335. That is, conveyor belt 300 may be driven, pulled, propelled, and/or guided by a structure such as drum 335. Drive surface 340 may contact the outer end of conveyor belt 300 at protruding portion 330. An exemplary configuration of a turn-curve belt arranged in a spiral about a drum is shown and discussed in U.S. Pat. No. 4,078,655, entitled "Small Radius Conveyor Belt and Conveying System," the entire disclosure of which is incorporated herein by reference.

In some embodiments, drum 335 may be configured to simply guide conveyor belt 300 along a designated path. That is, a separate drive mechanism may propel conveyor belt 300, and drum 335 may guide conveyor belt 300 along the designated path. In other embodiments, drum 335, in addition to guiding conveyor belt 300, may also be configured to propel conveyor belt 300. Thus, conveyor belt 300 may be configured to contact drive surface 340.

The drive surface of the drum or other such propulsion or guidance device may be configured to engage a conveyor belt. The drive surface may be made of any suitable material for such contact. For example, the drive surface of the drum may be made of rubber, plastic, metal, and other suitable materials. These materials can be hard, abrasive, and/or may carry debris that acts as an abrasive during contact of the drive surface with the contact weld on an outer portion of the conveyor belt. In some embodiments, protruding portions may be provided on the outer legs of links in order to form a contact surface configured to engage the drive surface of the drum. The contact surface of the protruding portion may form the outermost surface of the conveyor belt.

The substantial U-shape of links 305 defines an opening 345 between inner leg 315 and outer leg 320. Opening 345 may enable links 305 to nest with one another as shown at the end of conveyor belt 300 contacting drum 335 in FIG. 3B and as described in greater detail below.

Figure 4:
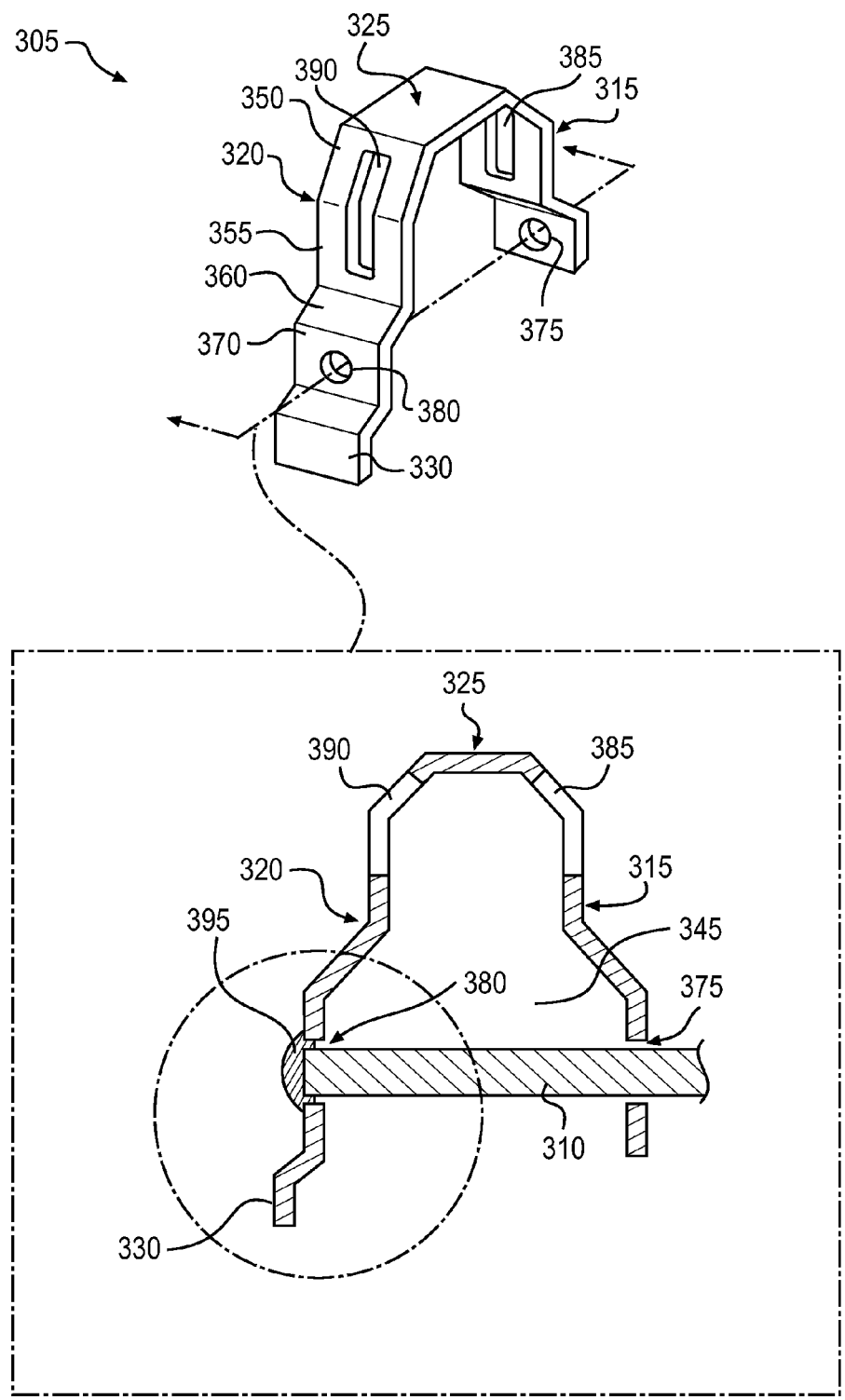
FIG. 4 is an illustration of perspective and cross-sectional views of an exemplary link and rod assembly of a conveyor belt.

FIG. 4 is an illustration of perspective and cross-sectional views of an exemplary link and rod assembly of conveyor belt 300. As shown in FIG. 4, outer leg 320 may include a first outwardly-tapering portion 350 extending from connecting portion 325, a first intermediate portion 355 extending substantially longitudinally from first outwardly-tapering portion 350 to a second outwardly-tapering portion 360. In addition, outer leg 320 may further include a second intermediate portion 370 extending substantially longitudinally from second outwardly tapering portion 360 to protruding portion 330.

This tapered configuration creates a wider lower portion of opening 345 to allow for the interconnection of links 305, as connecting portion 325 of one link may readily slide into a nesting relationship between inner leg 315 and outer leg 320 of an adjacent link. In some embodiments, the fitment of one link within another may be a relatively loose fitment, allowing several millimeters of lateral movement between the components. In other embodiments, the fitment may be substantially tighter, leaving only minimal space between the components, and thus, maintaining the links in a consistent alignment when nested.

It will be appreciated that form of the links joining together elongate rods is not limited to the configurations shown and discussed in the present disclosure. In some embodiments, the configuration of the connective links may be simpler than link 305. For example, in some embodiments, each leg of the link may include a single substantially longitudinal portion. Alternatively, the configuration of the connective link may be more involved for certain applications. For example, embodiments are envisioned wherein the connective links have more bends and/or a more complex shape than link 305. In addition, although inner leg 315 and outer leg 320 are shown in the accompanying drawings as having substantial mirror images of each other to provide symmetry for link 305, in other embodiments, link 305 may be asymmetrical (beyond the inclusion of protruding portion 330).

Each rod 310 may be fixedly attached to two links 305 (for example by welding), one at each end of the rod, forming a belt segment. Belt segments may be rotatably connected to one another. For example, as explained in greater detail below, each rod 310 may pass through slots in outer legs 320 and through corresponding slots in inner legs 315. While rods 310 may be fixedly attached to outer legs 320 at outer ends 327 of rods 310, rods 310 may be free to rotate within the slots. In addition, as will also be explained in greater detail below, conveyor belt 300 may be a collapsible type of conveyor belt. That is, the belt segments may be movable longitudinally with respect to one another. In order to facilitate this longitudinal collapsibility, the slots may be longitudinally oriented, thus allowing for longitudinal translation of a rod of a given belt segment within a link of an adjoining belt segment.

Conveyor belt 300 may be collapsible at both outer ends or at only one outer end. Further, in some embodiments, the outer ends may be independently collapsible, that is, each outer end may be collapsible independent of the opposite outer end of conveyor belt 300. This independent collapsibility may enable conveyor belt 300 to be propelled around turns. That is, when being propelled around a turn, the outer end of conveyor belt 300 that is on the inside of the turn may collapse longitudinally, whereas the outer end on the outside of the turn may remain expanded longitudinally. Conveyor belts that are configured to collapse on one or both sides may be referred to as "turn-curve" conveyor belts.

Wear Resistant Outermost Portions of Links

Protruding portions 330 may be provided at the outer ends of outer legs 320 of links 305. Thus, protruding portions 330 may each form an outermost surface of the conveyor belt configured to contact drive surface 340 of drum 335.

As shown in FIG. 4, rod 310 may be disposed within an aperture 375 in inner leg 315 of link 305 and within an aperture 380 in outer leg 320 of link 305. It should be noted that rod 310 is illustrated in FIG. 4 as being solid. However, embodiments are envisioned wherein rod 310 may be hollow. Outer leg 320 may be configured to receive rod 310 within aperture 380, and rod 310 may be fixedly attached within aperture 380. For example, rod 310 may be fixedly attached to outer leg 320 with a weld 395.

As shown in FIG. 4, link 305 may include an inner slot 385 in inner leg 315, and an outer slot 390 in outer leg 320. When conveyor belt 300 is assembled, the rod from another belt segment passes through inner slot 385 and outer slot 390. The longitudinal elongation of slots 385 and 390 enables the longitudinal collapse and expansion of conveyor belt 300, as discussed above.

The disclosed conveyor belt may be configured to contact a drive surface, and may include features for preventing or reducing wear of outer (i.e., side) surfaces of the belt. For example, the conveyor belt may include a substantially U-shaped link including an outermost portion having a contact surface configured to face the drive surface, wherein the outermost portion of the link is more resistant to wear due to contact with the drive surface than other portions of the link. In some embodiments, the outermost portion may include a protruding portion extending outward from the outer leg of the link.

The outermost portion of the link may be formed to be more resistant to wear than other portions of the link in any suitable way. The outermost portion may be formed of the same material as the rest of the link, but may be treated in some way that renders the outermost portion more resistant to wear than other portions of the link. For example, in some embodiments, the outermost portion of the link may be heat treated. In other embodiments, the outermost portion may be formed of a different material than the rest of the link. For example, in some embodiments, the material used for the outermost portion may be a different material that is more wear resistant than the materials of the rest of the link. Such a material may be incorporated into the outermost portion of the link in any suitable way. Exemplary ways of incorporating such wear resistant materials into the outermost portion are discussed in greater detail below.

In some embodiments, the outermost portion may be more wear resistant by virtue of being harder than the rest of the link. That is, since harder materials are often more wear resistant, the material of the outermost portion of the link may be altered or otherwise selected to be harder than other portions of the link.

In some embodiments, the contact weld may be more wear resistant by being formed of a material that is more durable. For example, contact weld may be formed of a material that, despite having a hardness that is similar to, or less than, the hardness of the other portions of the link, the outermost portion may be more resistant to wear by being formed of a material that has a high durability, such as cross-linked polymers, heat treated metals, and other suitable materials.

FIG. 5 is a close-up cross-sectional view of a portion of a conveyor belt link. In particular, FIG. 5 illustrates an outer leg 520 and protruding portion 530 that are respectively similar to outer leg 320 and 330 shown in FIG. 4. Protruding portion 530 may form the outermost portion of the link, and thus, may include an outermost contact surface 532 configured to contact a drive surface 533 of a drive element 534.

As shown in FIG. 5, the outermost portion of the link may include a protruding portion. For example, protruding portion 530 may be configured to extend outward beyond all other portions of the link/rod assembly. That is, protruding portion 530 may extend further outward than the rod, other portions of outer leg 520 of the link, any buttonhead on the rod, any weld fixing the rod to outer leg 520, and any other portion of the link/rod assembly.

Protruding portion 530 is illustrated as having an outwardly tapering portion and a longitudinally oriented portion. However, protruding portion may have any suitable configuration that extends to form the outermost portion of the link. Other protruding portions shown and discussed in the present disclosure may be similarly configured to protruding portion 520 as illustrated in FIG. 5 and described above.

As shown in FIG. 5, outer leg 520 may have a first portion 535 and a second, outermost portion 540 that is more resistant to wear than first portion 535. In some embodiments, first portion 535 and outermost portion 540 may be formed of a non-metal material. Further, in some embodiments, outermost portion 540 may be formed of substantially the same non-metal material as first portion 535, but the material of outermost portion 540 may be an altered version of the material forming other portions of the link, including first portion 535. For example, in some embodiments, outermost portion 540 may be formed of a cross-linked version of the material forming other portions of the link, including first portion 535. This altered non-metal configuration of outermost portion 540 is illustrated in FIG. 5 as a denser pattern of cross-sectional hatching in outermost portion 540 than in first portion 535. Any suitable non-metal materials may be used for first portion 535 and outermost portion 540, such as plastics, composites, such as carbon fiber, and other suitable materials. Persons having ordinary skill in the art will recognize suitable non-metal materials for use as first portion 535 and outermost portion 540 of the link according to the configurations described above.

FIG. 6 is a close-up cross-sectional view of a portion of another conveyor belt embodiment that includes an outermost portion of a link that is formed of an altered version of the material forming other portions of the link. Specifically, as shown in FIG. 6, in some embodiments, the outermost portion of the link may be formed of a surface treated version of the material forming other portions of the link, wherein the surface treatment renders the material more resistant to wear. FIG. 6 shows an outer leg 620 of a link, including a protruding portion 630. A first portion 635 may be formed of a non-metal material, and a second, outermost portion 640 may be formed of an altered version of the material of first portion 635. Specifically, in some embodiments, outermost portion 640 may be formed of a surface treated version of the material forming other portions of the link, including first portion 635. This surface treated, non-metal configuration of outermost portion 640 is illustrated in FIG. 6 as a denser pattern of cross-sectional hatching in the surface regions of outermost portion 640.

In some embodiments, the outermost portion of the link may be formed of a different, more wear resistant, non-metal material than other portions of the link. For example, in some embodiments, the outermost portion may be formed of a harder and/or more durable plastic than other portions of the link. Such a different material may be incorporated into the outermost portion in any suitable way, such as by bonding, coating, and/or fastening a separate piece of material onto the outer leg of the link using a fastener. It should also be noted that, in some embodiments, metals and plastics may be combined. For example, in some embodiments, a plastic link may include an outermost portion that includes a metal piece that forms the contact surface.

Figure 7:
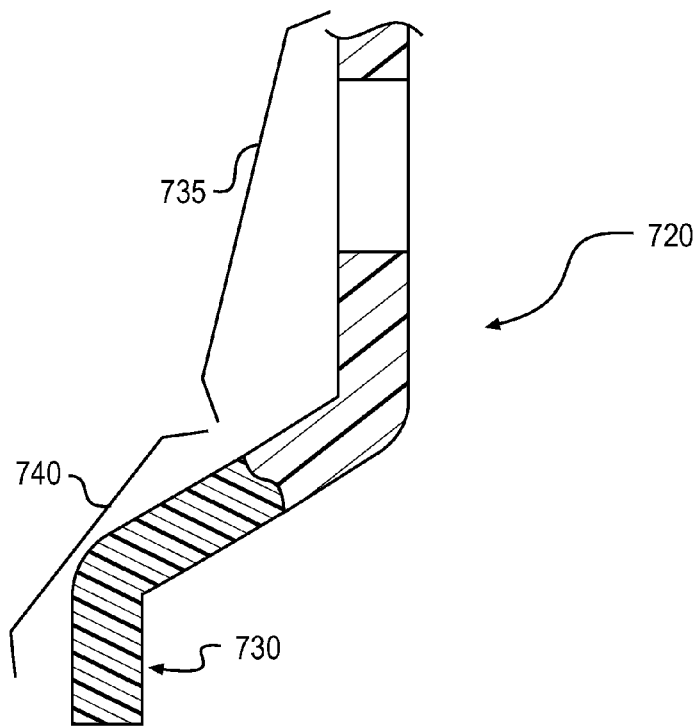
FIG. 7 is a close-up cross-sectional view of a portion of another conveyor belt link embodiment.

FIG. 7 is a close-up cross-sectional view of a portion of a link according to another conveyor belt embodiment. FIG. 7 illustrates an outer leg 720 of a link including a protruding portion 730. As shown in FIG. 7, in some embodiments, the outermost portion of the link may be formed of a different, more wear resistant material than other portions of the link. A first portion 735 of the link may be formed of a first non-metal material, and a second, outermost portion 740 may be formed of a second non-metal material that is different than the material of first portion 735. This configuration is illustrated in FIG. 7 with differing cross-sectional hatching in first portion 735 than in outermost portion 740. Specifically, outermost portion 740 includes a denser and differently-oriented pattern of cross-sectional hatching than first portion 735.

Configurations including two different non-metal materials may be formed using any suitable method. For example, in some embodiments, a configuration such as that shown in FIG. 7 may be formed by co-molding components of different materials. In other embodiments, pieces formed of the different materials may be joined using adhesive, bonding, welding, or other types of fixation. Skilled artisans will recognize suitable methods for forming links having such configurations.

Figure 8:
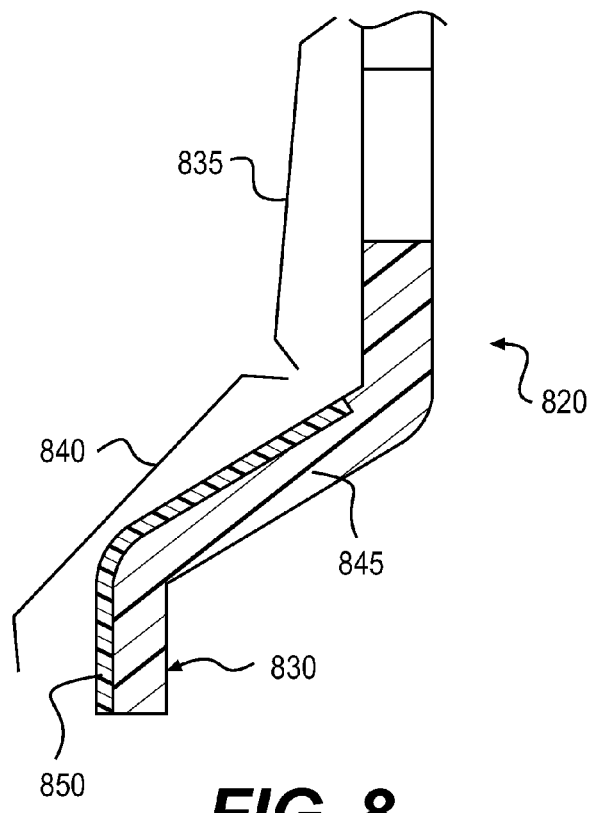
FIG. 8 is a close-up cross-sectional view of a portion of another conveyor belt link embodiment.

FIG. 8 shows another close-up cross-sectional view of a wear resistant portion of a link. FIG. 8 shows an outer leg 820 of a link including a protruding portion 830. As shown in FIG. 8, the link may include a first portion 835 and a second, outermost portion 840. In some embodiments, outermost portion 840 may include a substrate material 845, and a layer material 850 that is more resistant to wear than substrate material 845. The layer material 850 may be applied as a coating, layer, or a separate piece. Coatings may be applied using any suitable coating method. Layers and separate material pieces may be affixed to substrate material 845 using suitable methods, such as adhesive, bonding, welding, fasteners, and other such methods.

Metal materials may also be used for links according to the present disclosure. In some embodiments, outermost portions of links formed of metals may be treated in order to render the outermost portions more resistant to wear than other portions of the link. In other embodiments, a different metal material may be used for outermost portions than for other portions of the link.

Figure 9:
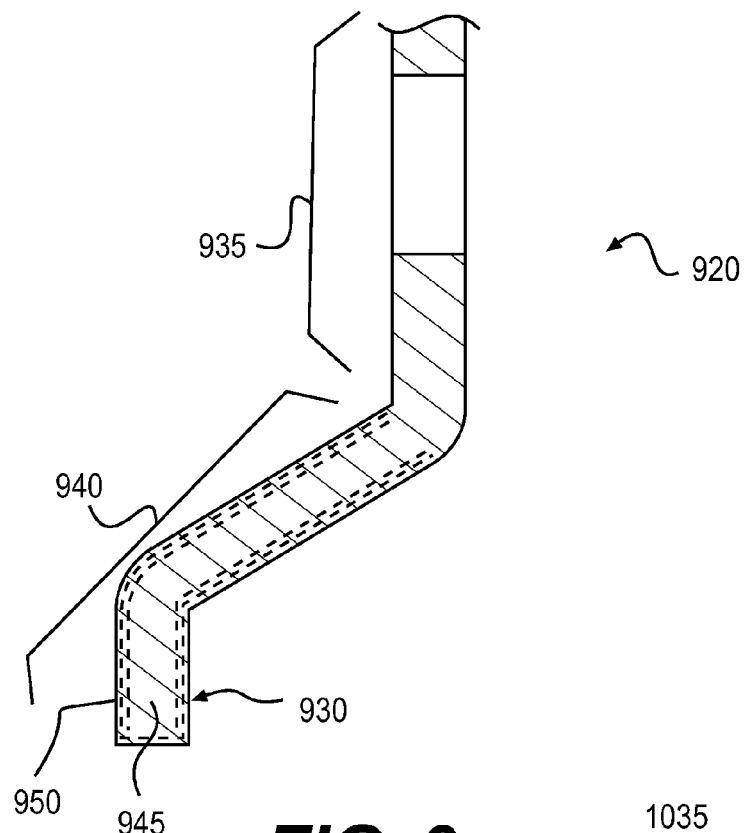
FIG. 9 is a close-up cross-sectional view of a portion of another conveyor belt link embodiment.

FIG. 9 shows another close-up cross-sectional view of a wear resistant portion of a link. FIG. 9 shows an outer leg 920 of a link including a protruding portion 930. As shown in FIG. 9, the link may include a first portion 935 and a second, outermost portion 940. In some embodiments, outermost portion 940 may be anodized. Anodizing may render the surface of outermost portion 940 harder and more wear resistant than first portion 935. This configuration is illustrated in FIG. 9, which shows outermost portion 940 as having an untreated core region 945 and a treated surface region 950. Other types of surface treatments may also be implemented in a similar manner as anodizing.

Figure 10:
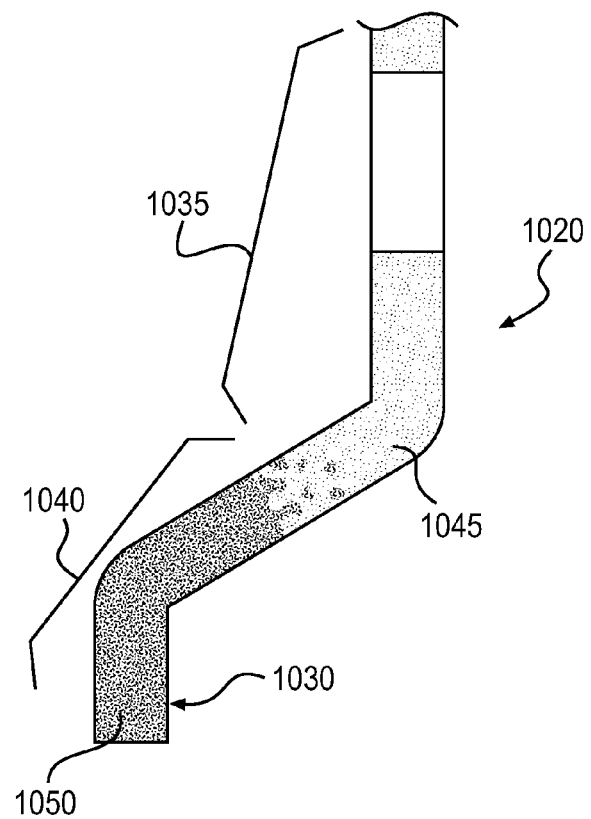
FIG. 10 is a close-up cross-sectional view of a portion of another conveyor belt link embodiment.

FIG. 10 shows another close-up cross-sectional view of a wear resistant portion of a link. FIG. 10 shows an outer leg 1020 of a link including a protruding portion 1030. As shown in FIG. 10, the link may include a first portion 1035 and a second, outermost portion 1040. In some embodiments, outermost portion 1040 may include a material that has been treated substantially through its entire thickness. For example, first portion 1035 is shown as having an untreated material 1045, whereas outermost portion 1040 is illustrated as having a treated portion 1050. In some embodiments, treated portion 1050 may be quenched (that is, subjected to martensitic transformation). Quenching may render outermost portion 1040 more wear resistant than other portions of the link, including first portion 1035 by, for example, making outermost portion 1040 harder than other portions of the link.

Figure 11:
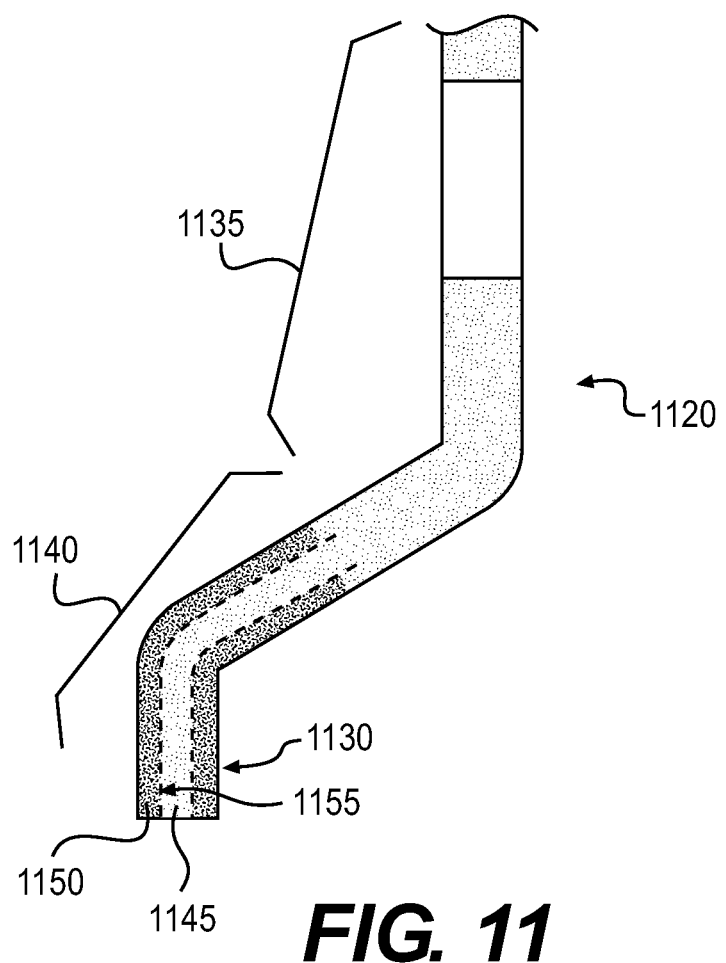
FIG. 11 is a close-up cross-sectional view of a portion of another conveyor belt link embodiment.

FIG. 11 shows another close-up cross-sectional view of a wear resistant portion of a link. FIG. 11 shows an outer leg 1120 of a link including a protruding portion 1130. As shown in FIG. 11, the link may include a first portion 1135 and a second, outermost portion 1140. In some embodiments, outermost portion 1140 may include a material that has been surface heat treated. For example, outermost portion 1140 is shown as having an untreated core region 1145, whereas the surface of outermost portion 1140 is illustrated as having a treated surface region 1150. Dashed lines 1155 indicate a definitive boundary between the treated and untreated regions. However, the boundary may, in some embodiments, be more transitional/gradual in nature.

Exemplary surface heat treatments may include case hardening, flame hardening, and induction hardening. By performing one of these hardening surface heat treatments on outermost portion 1140, outermost portion 1140 may be rendered harder and, therefore, more resistant to wear than other portions of the link, including first portion 1135.

In some embodiments, the conveyor belt may be at least partially assembled, and the outermost portion of the links may be simultaneously heated on a plurality of links assembled to form the conveyor belt by laying the outermost portions of the links on a heating surface and applying heat to the outermost portions. An exemplary heating surface may include, for example, a hot-plate type of table or other surface. In some embodiments, such a surface may include a heating element configured to heat the surface. By touching the outermost portions of the assembled conveyor belt links to the heating surface, the outermost portions may be heat treated. Accordingly surface heat treatments and/or full-thickness heat treatments, such as those discussed above, may be implemented using such a heating surface in order to render outermost portions of links of an assembled conveyor belt more resistant to wear than other portions of the links.

Figure 12:
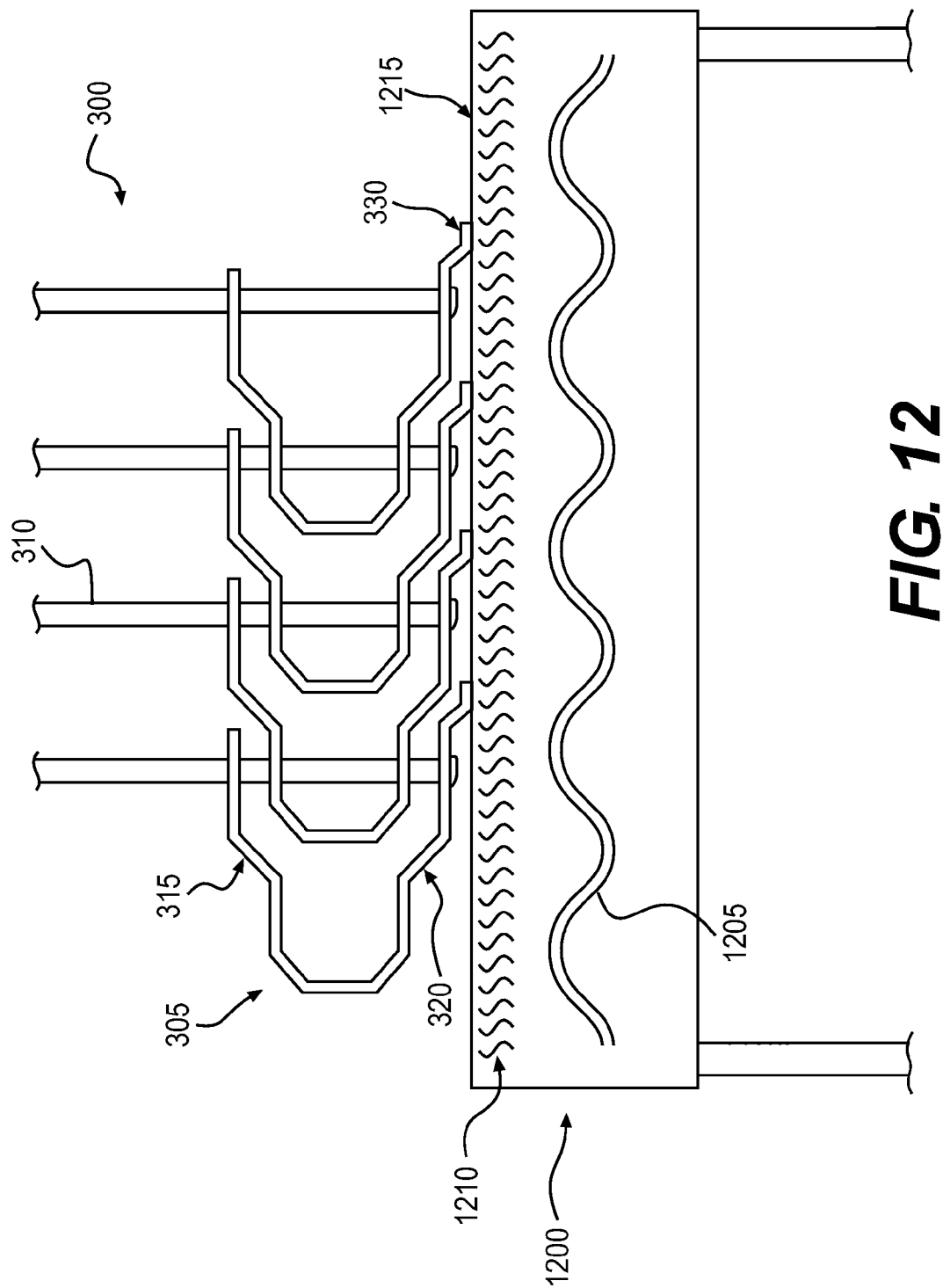
FIG. 12 illustrates an exemplary process for heat treating outermost portions of an assembled conveyor belt.

FIG. 12 illustrates an exemplary process for heat treating outermost portions of an assembled conveyor belt. As shown in FIG. 12, conveyor belt 300, including links 305 and rods 310 may be laid on a heating table 1200. Heating table 1200 may include a heating element 1205 configured to produce heat, illustrated by wavy lines 1210. In some embodiments, protruding portions 330 of links 305 may be placed in contact with a heating surface 1215 of heating table 1200. Application of heat by heating surface 1215 to protruding portions 330 at a suitable temperature, for a suitable duration, may heat treat protruding portions 330 in order to render the outermost portions of the links more resistant to wear than other portions of the links.

Other types of treatments that may be employed to render the outermost portions of links more wear resistant may involve cold working. For example, in some embodiments, the outermost portions of the links may be subjected to cold working, such as peening, forging, stamping, or coining.

Figure 13:
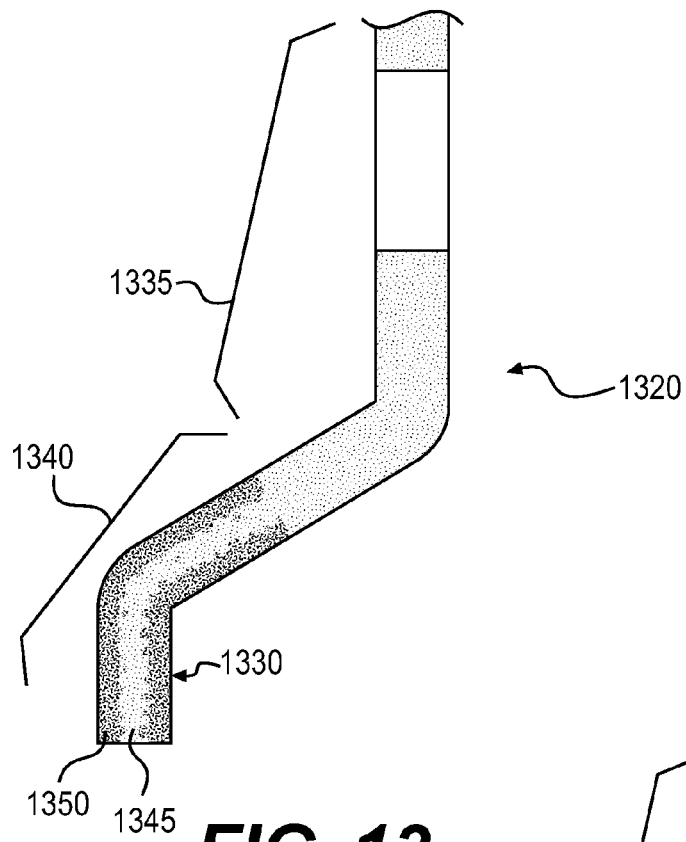
FIG. 13 is a close-up cross-sectional view of a portion of another conveyor belt link embodiment.

FIG. 13 shows another close-up cross-sectional view of a wear resistant portion of a link. FIG. 13 shows an outer leg 1320 of a link including a protruding portion 1330. As shown in FIG. 13, the link may include a first portion 1335 and a second, outermost portion 1340. In some embodiments, outermost portion 1340 may be cold worked. For example, outermost portion 1340 is shown as having an untreated core region 1345, whereas the surface of outermost portion 1340 is illustrated as having a treated surface region 1350. Treated surface region 1350 may be peened, forged, stamped, coined, or subjected to any other type of cold working.

As with non-metal link embodiments discussed above, metal link embodiments may include a link formed of different metals. For example, in some embodiments, the outermost portion of a link may be formed, at least in part, of a different material than the other portions of the link. In some embodiments, the outermost portion may include a separate piece of material attached to an end of the outer leg. Such a separate piece of material may be attached to the outer leg in any suitable manner as discussed in more detail below.

Figure 14:
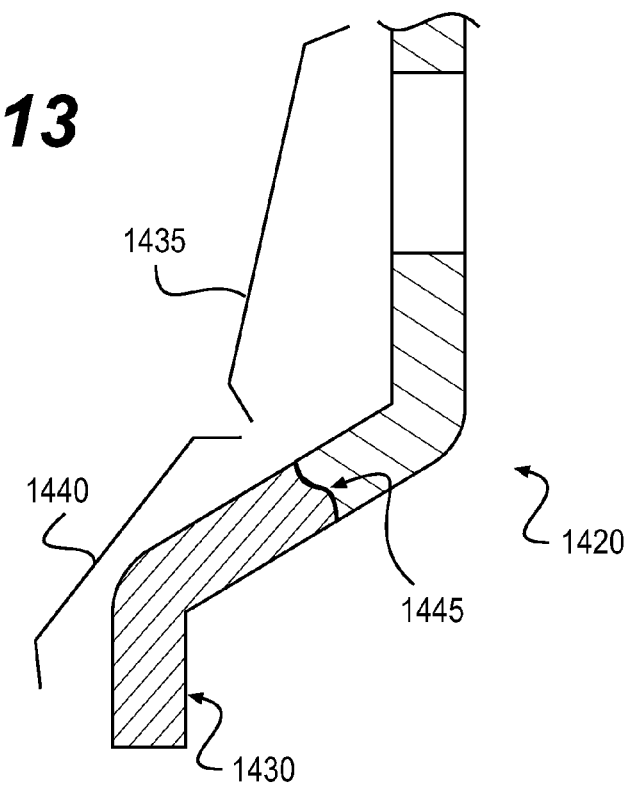
FIG. 14 is a close-up cross-sectional view of a portion of another conveyor belt link embodiment.

FIG. 14 shows another close-up cross-sectional view of a wear resistant portion of a link. FIG. 14 shows an outer leg 1420 of a link including a protruding portion 1430. As shown in FIG. 14, the link may include a first portion 1435 and a second, outermost portion 1440. In FIG. 14, a definitive boundary 1445 is indicated between first portion 1435 and outermost portion 1440. As shown in FIG. 14 by different cross-sectional hatching, first portion 1435 and outermost portion 1440 may be formed of different materials, wherein outermost portion 1440 is formed of a material that is more wear resistant than other portions of the link, including first portion 1435. Those having ordinary skill in the art will appreciate that the different materials may be joined by adhesive, bonding, welding or other suitable methods.

Figure 15:
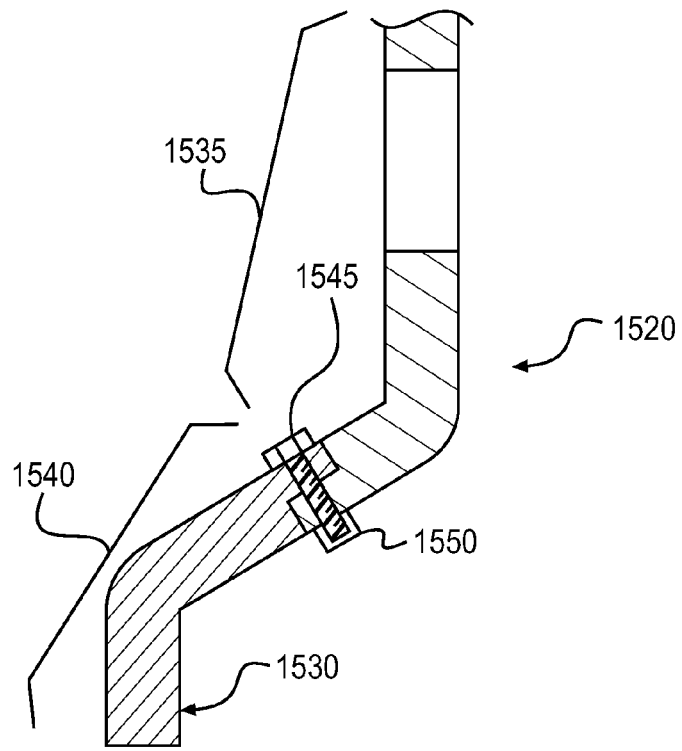
FIG. 15 is a close-up cross-sectional view of a portion of another conveyor belt link embodiment.

In addition, or as an alternative, to adhesives, bonding, welding, and other such attachment methods, fasteners may be utilized to attach a separate piece of wear resistant material to an outermost portion of a link. For example, FIG. 15 shows another close-up cross-sectional view of a wear resistant portion of a link, implementing a fastener. FIG. 15 shows an outer leg 1520 of a link including a protruding portion 1530. As shown in FIG. 15, the link may include a first portion 1535 and a second, outermost portion 1540. FIG. 15 shows different cross-sectional hatching to indicate the use of different materials for first portion 1535 and outermost portion 1530. As shown in FIG. 15, in some embodiments, outermost portion 1530 may be attached to first portion 1535 using fasteners, such as a bolt 1545 and a nut 1550. Other types of fasteners could also be used, such as screws, pins, or any other suitable fastener.

As shown in FIGS. 14 and 15, in some embodiments, a substantial majority of the protruding portion may be formed of the separate, wear resistant material. In other embodiments, a separate piece of wear resistant material may be fixedly attached to the outermost portion of the link as a layer or insert, for example, affixed to the protruding portion of the link.

Figure 16:
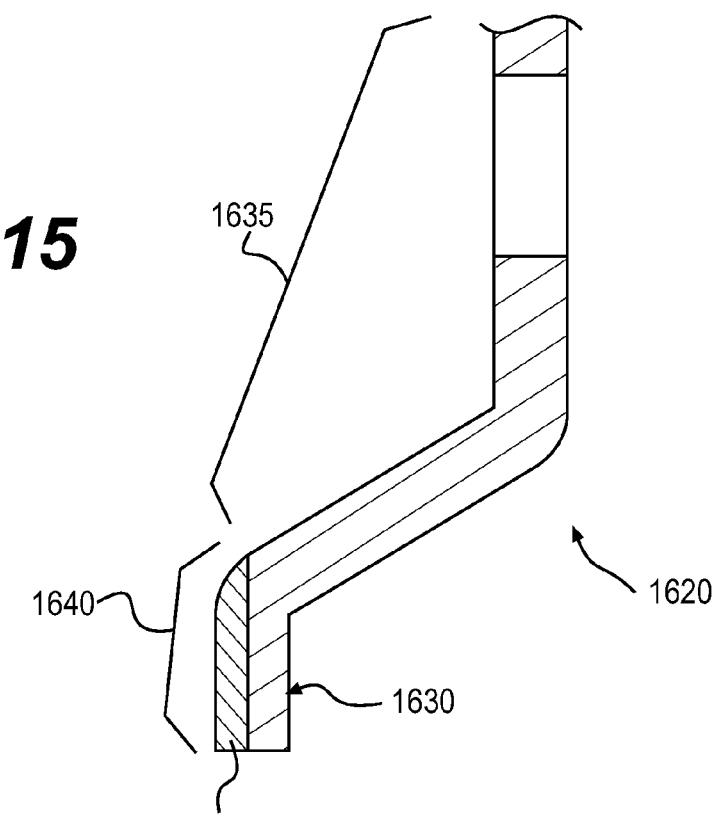
FIG. 16 is a close-up cross-sectional view of a portion of another conveyor belt link embodiment.

FIG. 16 shows another close-up cross-sectional view of a wear resistant portion of a link. FIG. 16 shows an outer leg 1620 of a link including a protruding portion 1630. As shown in FIG. 16, the link may include a first portion 1635 and a second, outermost portion 1640. In some embodiments, outermost portion 1640 may include a contact layer 1645 formed of a different, more wear resistant material than the rest of the link, including first portion 1635. Contact layer 1645 may be fixedly attached to protruding portion 1630 using any suitable method, such as adhesive, bonding, welding, or any other suitable method.

Figure 17:
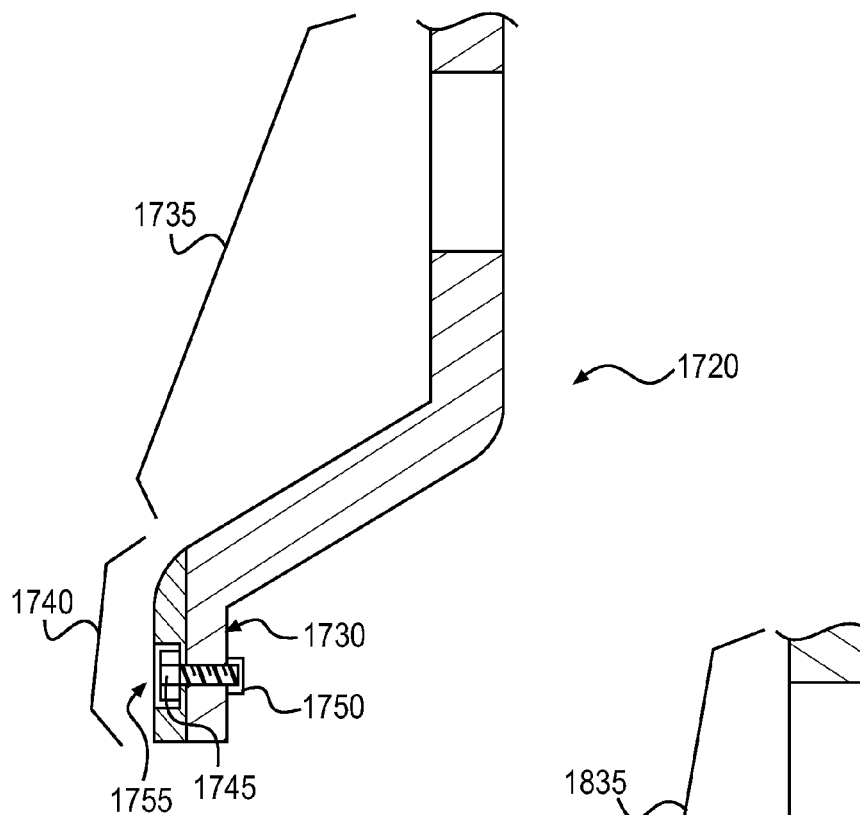
FIG. 17 is a close-up cross-sectional view of a portion of another conveyor belt link embodiment.

FIG. 17 shows another close-up cross-sectional view of a wear resistant portion of a link. FIG. 17 shows an outer leg 1720 of a link including a protruding portion 1730. As shown in FIG. 17, the link may include a first portion 1735 and a second, outermost portion 1740. FIG. 17 shows an embodiment having a contact layer similar to contact layer 17, but is affixed to protruding portion 1730 of outer leg 1720 with fasteners, such as a bolt 1745 and a nut 1750. As shown in FIG. 17, since bolt 1745 is disposed on an outermost side of contact layer 17, bolt 1745 may be countersunk within a recess 1755. Other types of fasteners could also be used to secure contact layer 17, as discussed above with respect to FIG. 15.

In some embodiments, a wear resistant coating may be applied to the outermost portion of the link. Such a coating may be applied in any suitable manner.

Figure 18:
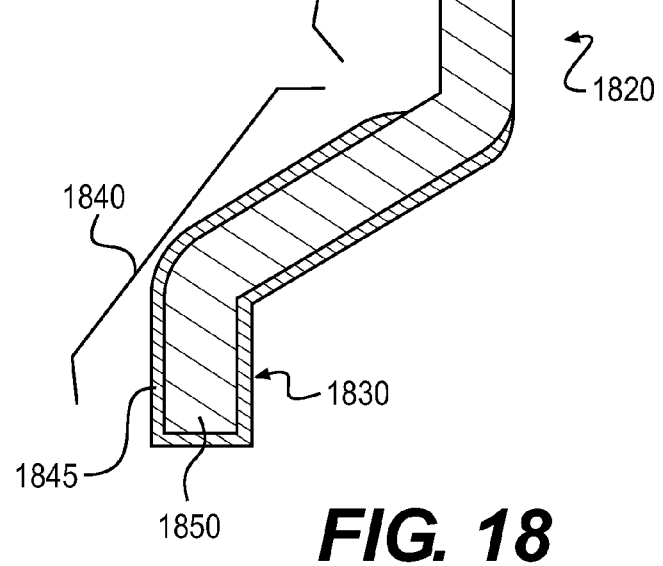
FIG. 18 is a close-up cross-sectional view of a portion of another conveyor belt link embodiment.

FIG. 18 shows a close-up cross-sectional view of a wear resistant portion of a link including a coating. FIG. 18 shows an outer leg 1820 of a link including a protruding portion 1830. As shown in FIG. 18, the link may include a first portion 1835 and a second, outermost portion 1840. In some embodiments, a coating 1845 may applied over a substrate material 1850 of outer leg 1820. Coating 1845 may be applied in any suitable way, including, for example, dipping, plasma coating, or any other suitable method.

The present disclosure is also directed to methods for making a conveyor belt portion wear resistant. Such methods may include forming a substantially U-shaped link including an outermost portion having a contact surface configured to face a drive surface. The methods may also include rendering the outermost portion of the link more resistant to wear due to contact with the drive surface than other portions of the link.

In some embodiments, forming a substantially U-shaped link may include forming an inner leg and an outer leg. Further, forming the outermost portion may include forming a protruding portion extending outward from the outer leg.

In some embodiments, rendering the outermost portion of the link more resistant to wear may include making the outermost portion harder than other portions of the link. For example, making the outermost portion harder may include anodizing, heat treating, and/or quenching the outermost portion. In some embodiments, making the outermost portion harder may include surface hardening the outermost portion. For example, making the outermost portion harder may include flame hardening, induction hardening, or case hardening the outermost portion.

In some embodiments, making the outermost portion harder may include cold-working the outermost portion. For example, making the outermost portion harder may include peening, forging, stamping, or coining the outermost portion.

In some embodiments, rendering the outermost portion of the link more resistant to wear may include forming at least part of the outermost portion from a different material than the other portions of the link. For example, the method may include attaching a separate piece of material to an end of the outer leg of the link. In some embodiments, forming at least part of the outermost portion from a different material may include applying a coating or layer to the outermost portion of the link.

In some embodiments, the link may be formed of a non-metal material and rendering the outermost portion of the link more resistant to wear may include altering the non-metal material in at least part of the outermost portion. For example, altering the non-metal material may include at least one of cross-linking and surface treating the non-metal material.

Wear Resistant Connecting Portions of Links

In addition to outer portions of conveyor belts, other parts of conveyor belts may be subject to wear. For example, in some cases, connecting portions between link legs may be subject to wear. Accordingly, the present disclosure is also directed to embodiments including wear resistant connecting portions. For example, in some embodiments, a substantially U-shaped link configured to receive a rod may include a first leg, a second leg, and a connecting portion connecting the first leg and the second leg, wherein the connecting portion is anodized, heat treated, or formed of a different material than the first and second leg, and is more resistant to wear than the first or second leg.

Figure 19:
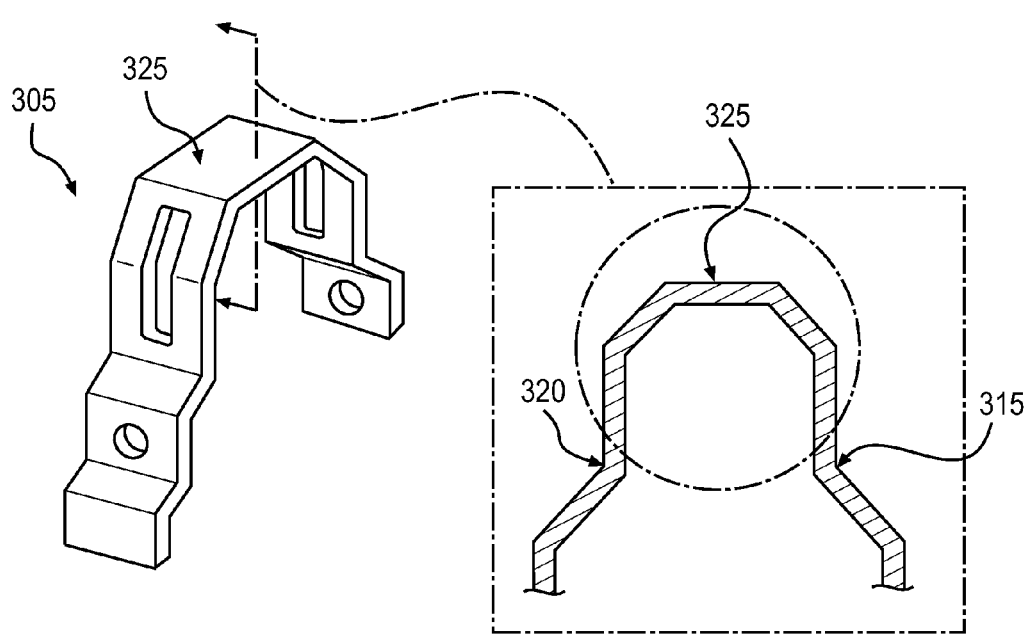
FIG. 19 is an illustration of perspective and cross-sectional views of an exemplary link and rod assembly of a conveyor belt.

FIG. 19 is an illustration of perspective and cross-sectional views of an exemplary link and rod assembly of a conveyor belt. In particular, FIG. 19 illustrates a perspective view of link 305, as well as a cross-sectional view of portions of link 305 including connecting portion 325.

Figure 20:
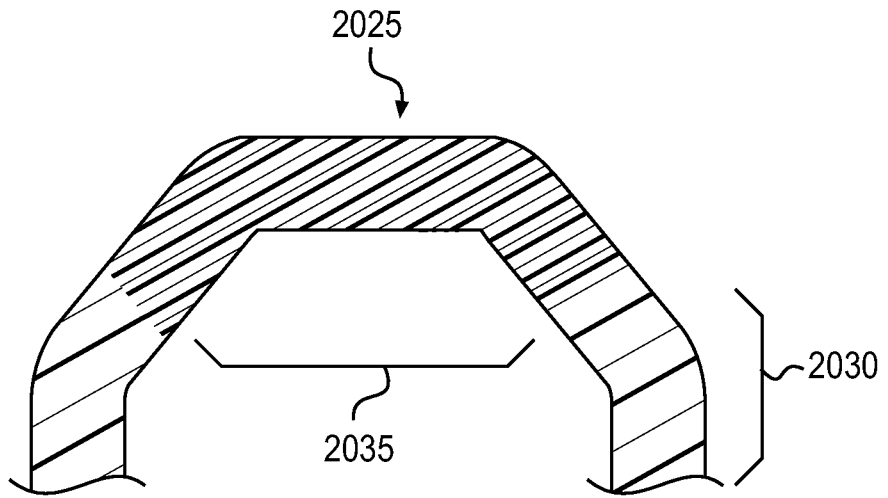
FIG. 20 is a close-up cross-sectional view of a portion of a conveyor belt link embodiment.

FIG. 20 is a close-up cross-sectional view of a link portion in the area indicated by the dotted circle in FIG. 19. FIG. 20 illustrates a connecting portion 2025 of a link. FIG. 20 also shows a first portion 2030 of the link and a second, wear resistant portion 2035 of the link. In some embodiments, wear resistant portion 2035 may include a material that is an altered version of the material of first portion 2030. FIG. 20 illustrates an embodiment including, for example, a cross-linked material implemented for wear resistant portion 2035. Utilization of cross-linking is discussed in more detail above with respect to FIG. 5.

Figure 21:
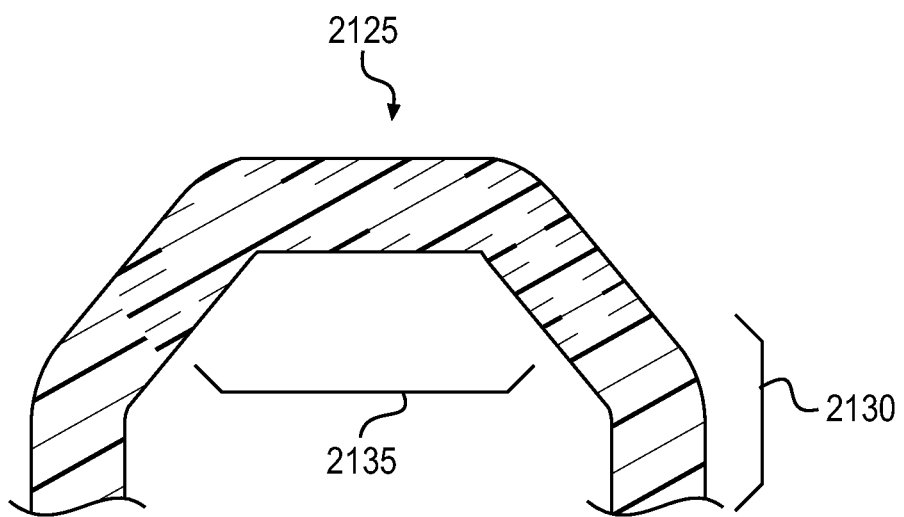
FIG. 21 is a close-up cross-sectional view of a portion of another conveyor belt link embodiment.

FIG. 21 is a close-up cross-sectional view of a portion of another conveyor belt embodiment. FIG. 21 illustrates a connecting portion 2125 of a link. FIG. 21 also shows a first portion 2130 of the link and a second, wear resistant portion 2135 of the link. FIG. 21 illustrates an embodiment employing a surface treatment of a non-metallic link to render a portion of the link more wear resistant. Similar concepts are discussed in more detail above with respect to FIG. 6.

Figure 22:
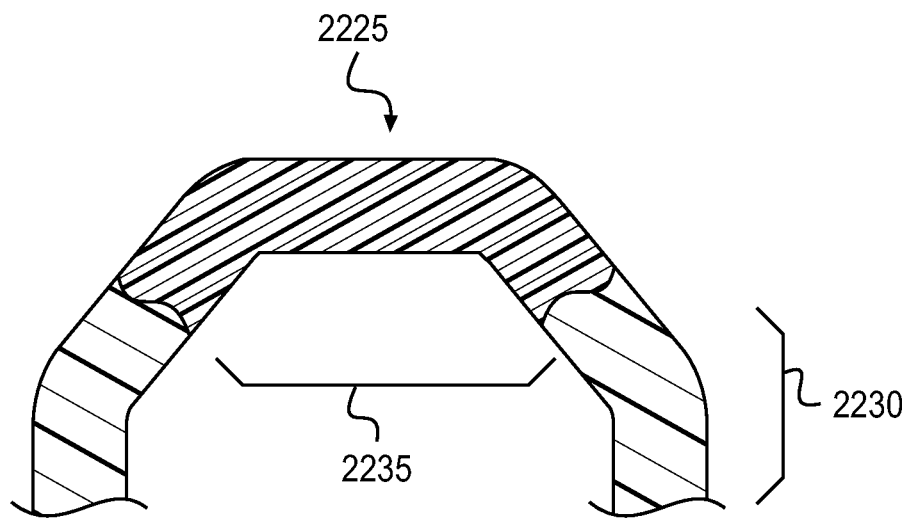
FIG. 22 is a close-up cross-sectional view of a portion of another conveyor belt link embodiment.

FIG. 22 is a close-up cross-sectional view of a portion of another conveyor belt embodiment. FIG. 22 illustrates a connecting portion 2225 of a link. FIG. 22 also shows a first portion 2230 of the link and a second, wear resistant portion 2235 of the link. FIG. 22 shows an embodiment implementing a different non-metal material for wear resistant portion 2235. Such a different material may be, for example, co-molded with the material of first portion 2230. Similar concepts are discussed in more detail above with respect to FIG. 7.

Figure 23:
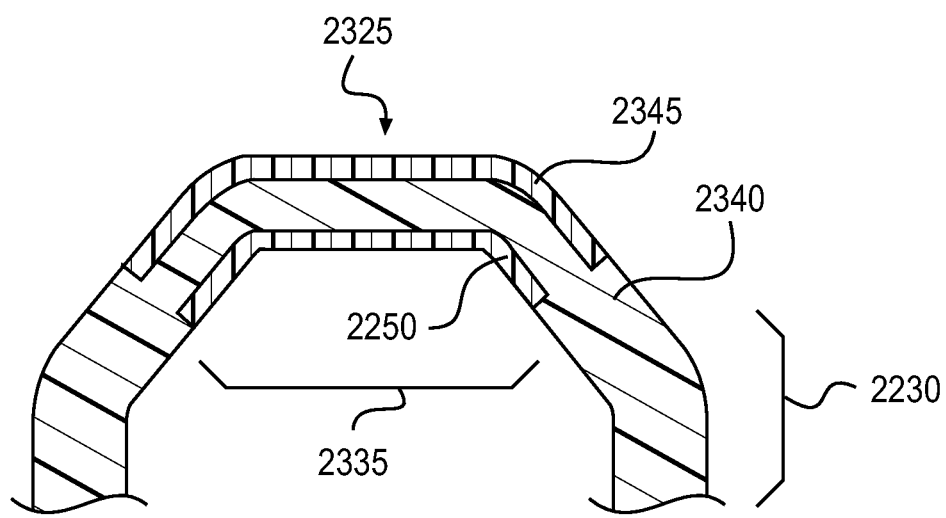
FIG. 23 is a close-up cross-sectional view of a portion of another conveyor belt link embodiment.

FIG. 23 is a close-up cross-sectional view of a portion of another conveyor belt embodiment. FIG. 23 illustrates a connecting portion 2325 of a link. FIG. 23 also shows a first portion 2330 of the link and a second, wear resistant portion 2335 of the link. FIG. 23 also shows a layer or inserts formed of a different non-metal material than a substrate material 2340 of the link. For example, in some embodiments, a first insert 2345 may be incorporated on one side of connecting portion 2325, and a second insert 2350 may be incorporated on a second side of connecting portion 2325. Use of layers or inserts formed of non-metal materials that differ from the materials of other portions of the link is discussed in more detail above with respect to FIG. 8.

Figure 24:
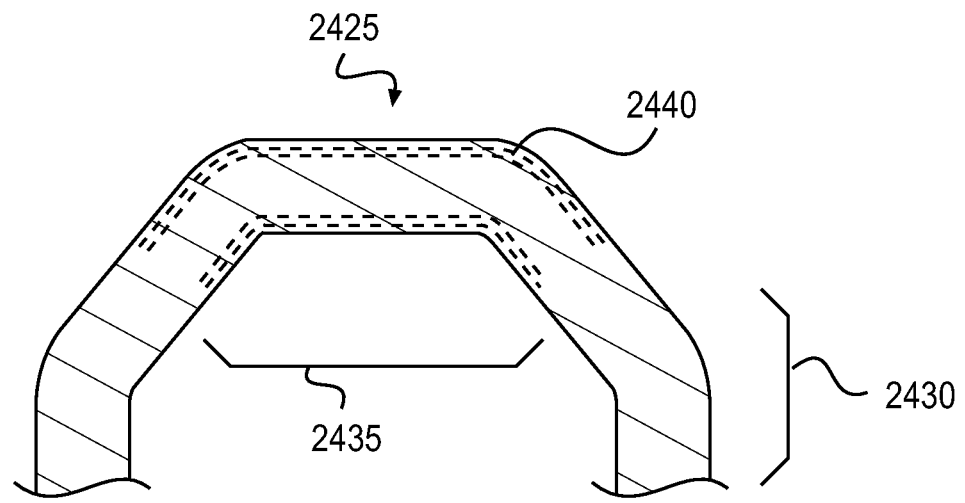
FIG. 24 is a close-up cross-sectional view of a portion of another conveyor belt link embodiment.

FIG. 24 is a close-up cross-sectional view of a portion of another conveyor belt embodiment. FIG. 24 shows a connecting portion 2425 of a link. FIG. 24 also shows a first portion 2430 of the link and a second, wear resistant portion 2435 of the link. FIG. 24 shows a surface treatment, such as anodizing. For example, a treated layer 2440 indicates that portions of wear resistant portion 2435 may be surface treated, for example, by anodizing. Anodizing is discussed in more detail above with respect to FIG. 9.

Figure 25:
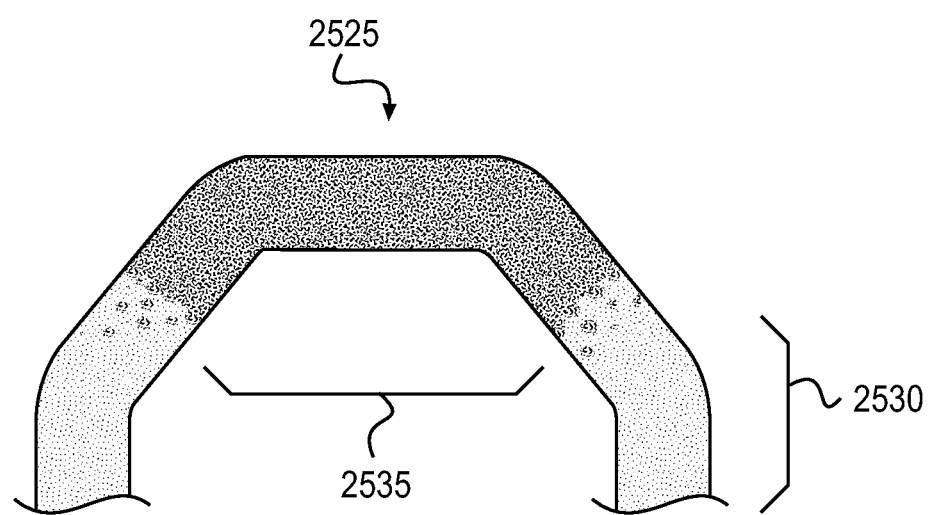
FIG. 25 is a close-up cross-sectional view of a portion of another conveyor belt link embodiment.

FIG. 25 is a close-up cross-sectional view of a portion of another conveyor belt embodiment. FIG. 25 shows a connecting portion 2525 of a link. FIG. 25 also shows a first portion 2530 of the link and a second, wear resistant portion 2535 of the link. FIG. 25 illustrates an embodiment, wherein wear resistant portion 2535 may be quenched. Embodiments implementing quenching as a way to provide wear resistance are also discussed above in connection with FIG. 10.

Figure 26:
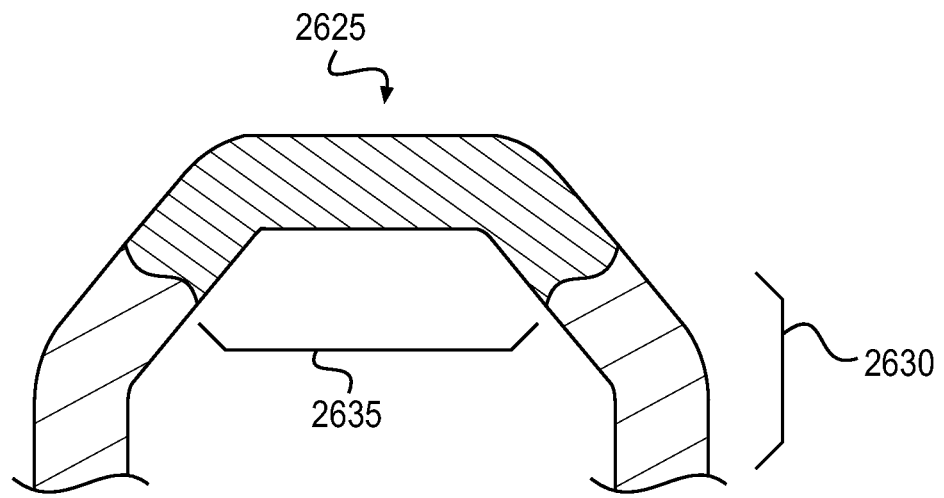
FIG. 26 is a close-up cross-sectional view of a portion of another conveyor belt link embodiment.

FIG. 26 shows a connecting portion 2625 of a link. FIG. 26 also shows a first portion 2630 of the link and a second, wear resistant portion 2635 of the link. FIG. 26 shows an embodiment implementing different metal materials for first portion 2630 and wear resistant portion 2630. These materials may be joined by adhesive, bonding, welding, or other methods. An embodiment employing similar concepts is discussed above with respect to FIG. 14.

Figure 27:
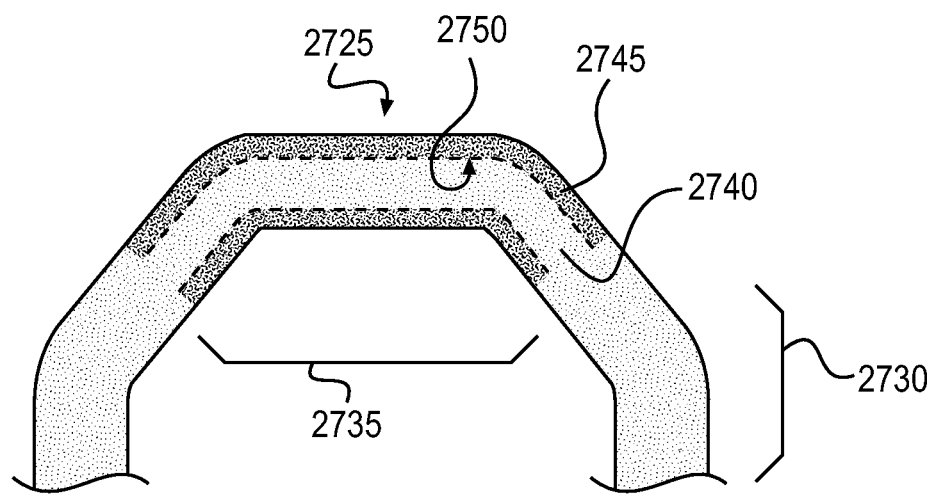
FIG. 27 is a close-up cross-sectional view of a portion of another conveyor belt link embodiment.

FIG. 27 shows a connecting portion 2725 of a link. FIG. 27 also shows a first portion 2730 of the link and a second, wear resistant portion 2735 of the link. FIG. 27 illustrates an embodiment employing surface heat treatments to provide wear resistance. Such surface heat treatments may include, for example, case hardening, flame hardening, and induction hardening. A core region 2740 may be disposed between heat treated surface regions 2745. A dashed line 2750 delineates a boundary between untreated core region 2740 and heat treated surface regions 2745. However, in some embodiments, the transition between heated and untreated regions may be more gradual. Similar concepts are discussed above in conjunction with the description of FIG. 11.

Figure 28:
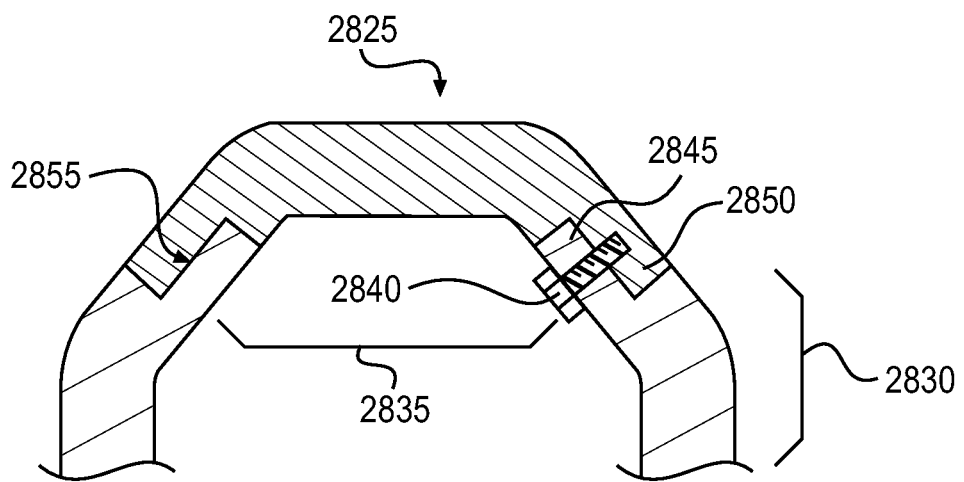
FIG. 28 is a close-up cross-sectional view of a portion of another conveyor belt link embodiment.

FIG. 28 shows a connecting portion 2825 of a link. FIG. 28 also shows a first portion 2830 of the link and a second, wear resistant portion 2835 of the link. FIG. 28 shows an embodiment including a fastener 2840 used to fixedly attach leg portions 2845 of the link to a separate piece of material 2850 used to form connecting portion 2825. Use of fasteners is discussed in more detail above, for example, in connection with FIG. 15. FIG. 28 also illustrates that the connection between different metallic link materials may be made using a similar joint where the components overlap, but no fastener is used. Instead adhesive, bonding, welding, or other types of attachment mechanisms may be utilized, for example, at an interface 2855 between first portion 2830 and separate piece 2850.

Figure 29:
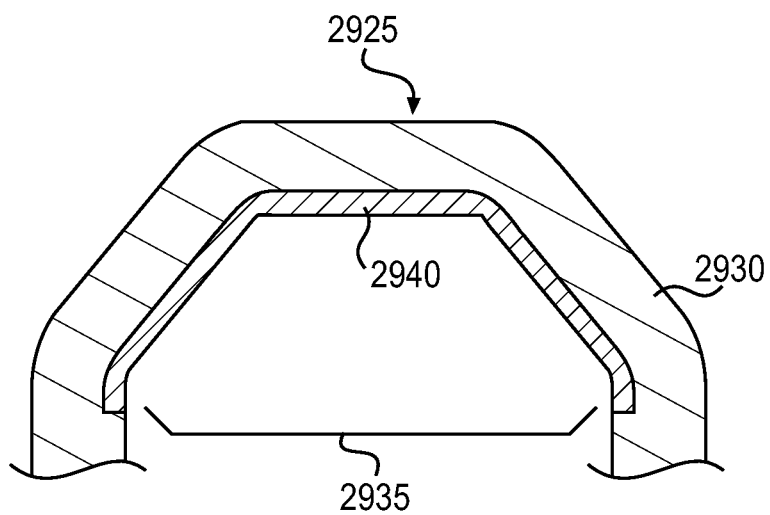
FIG. 29 is a close-up cross-sectional view of a portion of another conveyor belt link embodiment.

FIG. 29 shows a connecting portion 2925 of a link. FIG. 29 also shows a first portion 2930 of the link and a second, wear resistant portion 2935 of the link. FIG. 29 shows an embodiment including an insert 2940 formed of a different material than other portions of the link, including first portion 2930. Attachment of such an insert or layer of wear resistant material is discussed above in more detail regarding FIG. 16.

Figure 30:
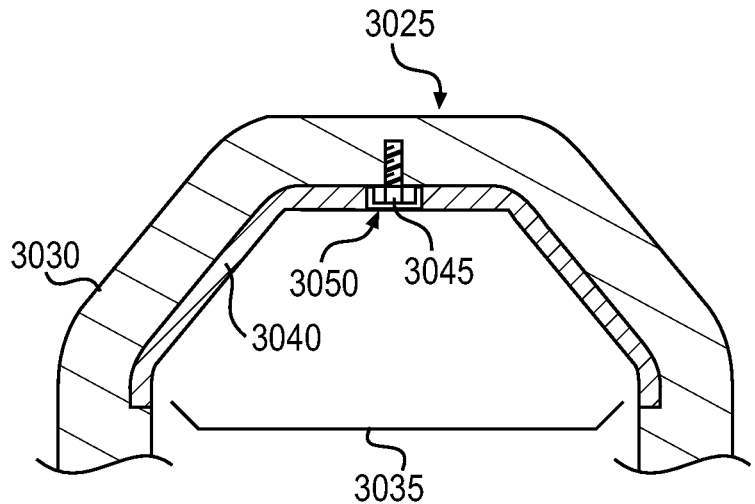
FIG. 30 is a close-up cross-sectional view of a portion of another conveyor belt link embodiment.

FIG. 30 shows a connecting portion 3025 of a link. FIG. 30 also shows a first portion 3030 of the link and a second, wear resistant portion 3035 of the link. FIG. 30 shows an embodiment similar to that shown in FIG. 29, except that the embodiment shown in FIG. 30 includes an insert 3040 fixedly attached to the connecting portion 3025 by a fastener 3045, which may be countersunk in a recess 3050. Use of countersunk fasteners to attach wear resistant inserts is discussed in more detail above regarding FIG. 17.

Figure 31:
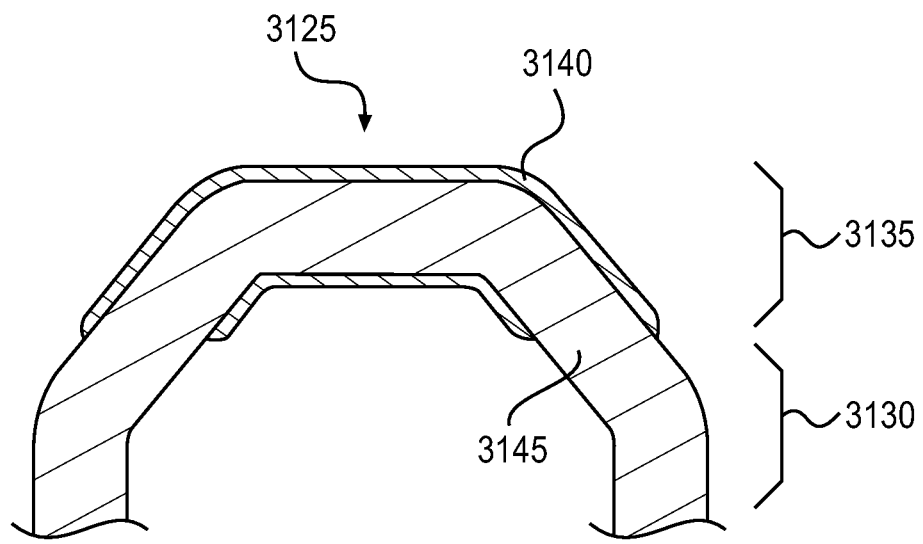
FIG. 31 is a close-up cross-sectional view of a portion of another conveyor belt link embodiment.

FIG. 31 shows a connecting portion 3025 of a link. FIG. 31 also shows a first portion 3130 of the link and a second, wear resistant portion 3135 of the link. FIG. 31 shows an embodiment including a wear resistant coating 3140 disposed on a substrate material 3145 in wear resistant portion 3135 of the link. Use of wear resistant coatings is discussed in more detail above with respect to FIG. 18.

Figure 32:
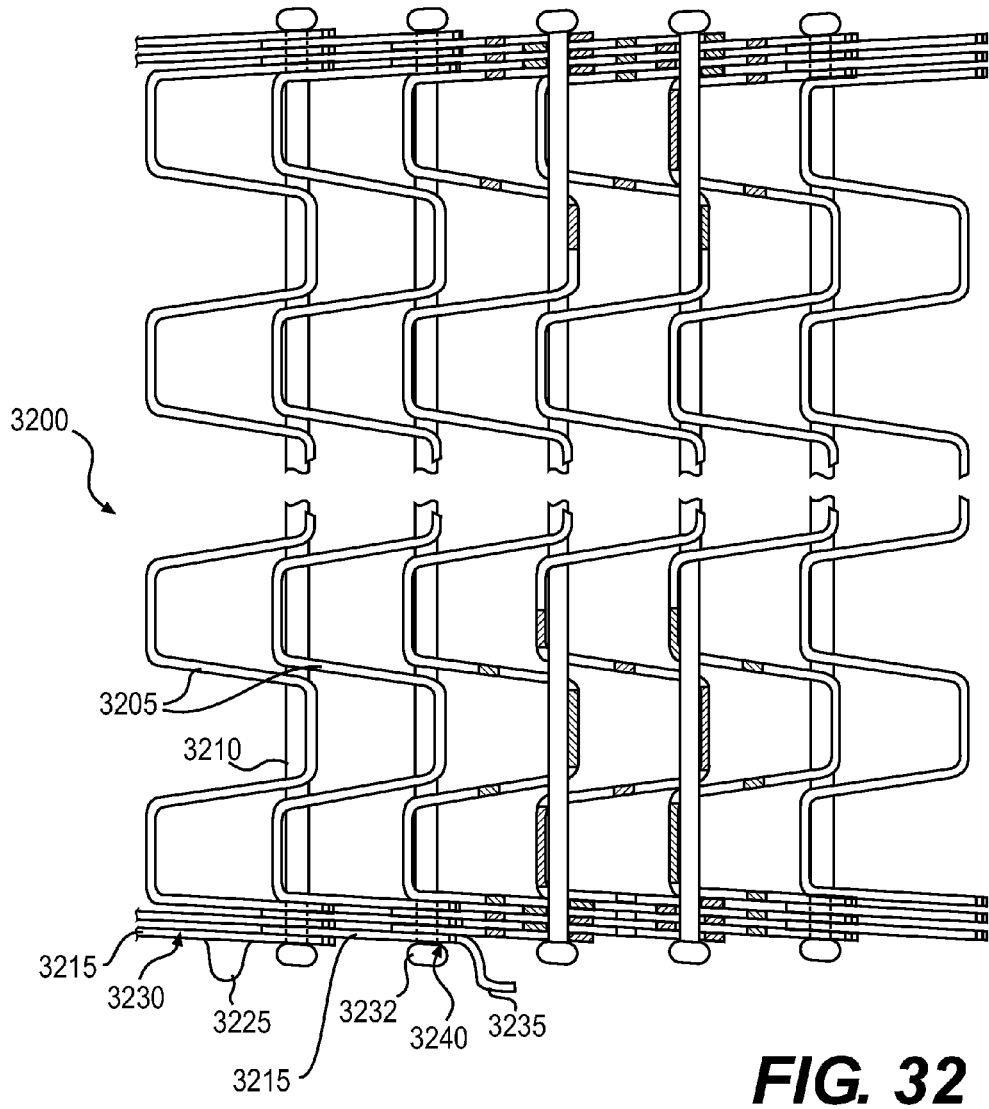
FIG. 32 is a top view of another exemplary conveyor belt embodiment.
Figure 33:
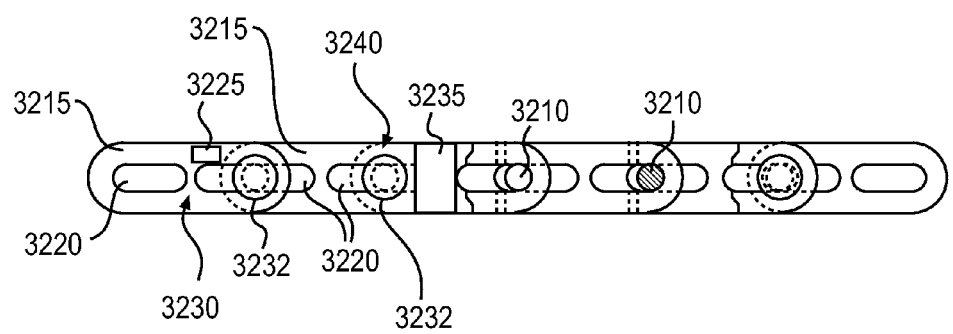
FIG. 33 is a side view of the conveyor belt shown in FIG. 32.

FIGS. 32 and 33 illustrate another exemplary conveyor belt embodiment. FIG. 32 shows a conveyor belt 3200, including a plurality of pitches 3205, connected by a plurality of rods 3210 and a plurality of bar links 3215. As shown in FIGS. 32 and 33, bar links 3215 may have a substantially straight configuration. Bar links 3215 may include slotted apertures 3220, which may enable conveyor belt 3200 to be collapsible.

In some embodiments, one or more of bar links 3215 may include a wear resistant protruding portion 3225. As shown in FIGS. 32 and 33, protruding portions 3225 may extend from a central portion 3230 of bar link 3215. As shown in FIG. 32, protruding portions 3225 may extend to form the outermost portion of conveyor belt 3200, and thus, may extend beyond buttonheads 3232 of rods 3210.

Alternatively or additionally, conveyor belt 3200 may include protruding portions 3235, which may extend from end portions 3240 of bar links 3215, as shown in FIGS. 32 and 33. Although illustrated as extending from central portion 3230 and end portion 3240, protruding portions 3225 and/or protruding portions 3235 may extend from any suitable portions of bar links 3215. The outermost portion of conveyor belt 3200 may be more resistant to wear due to contact with a drive surface than other portions of conveyor belt 3200. For example, protruding portions 3225 and/or protruding portions 3235 may be formed of a harder material than other portions of conveyor belt 3200.

It will be noted that, while FIG. 32 illustrates an embodiment having multiple bar links 3215 at each pitch (essentially stacked laterally), embodiments are envisioned wherein only a single bar link 3215 may be provided at each pitch. The use of a single bar link or stacked bar link arrangement may be based on a number of different parameters, including the desired strength and durability of the conveyor belt. That is, a stacked arrangement may provide reinforcement, and thus, additional strength and durability of the link assembly.

While various embodiments of the invention have been described, the description is intended to be exemplary, rather than limiting and it will be apparent to those of ordinary skill in the art that many more embodiments and implementations are possible that are within the scope of the invention. Accordingly, the invention is not to be restricted except in light of the attached claims and their equivalents. Also, various modifications and changes may be made within the scope of the attached claims.

What is claimed is:

1. A conveyor belt configured to contact a drive surface, the conveyor belt comprising:
a substantially U-shaped link including an outer surface, the outer surface having a first area and a second area that are spaced apart from each other, the first area included on an outermost portion of the link, the first area of the outer surface configured to contact and face the drive surface;
wherein the first area is more resistant to wear than the second area of the outer surface of the link.

2. The conveyor belt according to claim 1, wherein the link includes an inner leg, and an outer leg, and wherein the outermost portion includes a protruding portion extending outward from the outer leg.

3. The conveyor belt according to claim 1, wherein the outermost portion is harder than other portions of the link.

4. The conveyor belt according to claim 3, wherein the outermost portion is anodized.

5. The conveyor belt according to claim 3, wherein the outermost portion is heat treated.

6. The conveyor belt according to claim 3, wherein the outermost portion is quenched.

7. The conveyor belt according to claim 3, wherein the outermost portion is surface hardened.

8. The conveyor belt according to claim 7, wherein the outermost portion is flame hardened, induction hardened, or case hardened.

9. The conveyor belt according to claim 3, wherein the outermost portion is cold-worked.

10. The conveyor belt according to claim 9, wherein the outermost portion is peened, forged, stamped, or coined.

11. The conveyor belt according to claim 1, wherein the outermost portion is formed of a metal.

12. The conveyor belt according to claim 1, wherein the first area is formed, at least in part, of a different material than the second area.

13. The conveyor belt according to claim 12, wherein the link includes a first piece and a second piece that are removably attached, wherein the first piece and the second piece cooperate to define the outer surface of the link, wherein the first piece includes the first area, and wherein the second piece includes the second area.

14. The conveyor belt according to claim 12, wherein the different material includes a coating or layer applied to the outermost portion of the link.

15. The conveyor belt according to claim 1, wherein the first area is formed of a non-metal material that is an altered version of a material forming the second area.

16. The conveyor belt according to claim 15, wherein the non-metal material is at least one of a cross-linked version of the material forming the second area and a surface treated version of the material forming the second area.

17. The conveyor belt according to claim 1, wherein the first area is formed of a non-metal material that is different than a material forming the second area.

18. A conveyor belt configured to contact a drive surface, the conveyor belt comprising:
a rod having a free end, wherein the rod comprises an elongated portion of a rod material;
a substantially U-shaped link configured to receive the rod, the link having a first leg, a second leg, and a connecting portion connecting the first leg and the second leg,
wherein the connecting portion is anodized, heat treated, or formed of a different material than the first and second leg, and
wherein the connecting portion is more resistant to wear than the first or second leg.

19. The conveyor belt according to claim 18, wherein the connecting portion is harder than other portions of the link.

20. The conveyor belt according to claim 19, wherein the connecting portion is surface hardened.

21. The conveyor belt according to claim 20, wherein the connecting portion is flame hardened, induction hardened, or case hardened.

22. The conveyor belt according to claim 18, wherein the connecting portion is formed of a different material than the first and second legs, and wherein the connecting portion includes a separate piece of material connected to the connecting portion.

23. The conveyor belt according to claim 18, wherein the connecting portion is formed of a different material than the first and second legs, and wherein the different material includes a coating or layer applied to the connecting portion of the link.

24. The conveyor belt according to claim 18, wherein the connecting portion is formed of a non-metal material that is an altered version of a material forming the other portions of the link.

25. The conveyor belt according to claim 24, wherein the non-metal material is at least one of a cross-linked version of the material forming the other portions of the link and a surface treated version of the material forming the other portions of the link.

26. The conveyor belt according to claim 18, wherein the outermost portion is formed of a non-metal material that is a different material from other portions of the link.

27. A method of making a conveyor belt portion configured to contact a drive surface wear resistant, comprising:
- forming a substantially U-shaped link including an outer surface, the outer surface having a first area and a second area that are spaced apart from each other, the first area included on an outermost portion of the link, the first area of the outer surface configured to contact and face the drive surface; and
- rendering the first area more resistant to wear than the second area of the outer surface of the link.

28. The method of claim 27, wherein forming the substantially U-shaped link includes forming an inner leg and an outer leg, and forming the outermost portion to include a protruding portion extending outward from the outer leg.

29. The method of claim 27, wherein rendering the first area includes making the outermost portion harder than other portions of the link.

30. The method of claim 29, wherein making the outermost portion harder includes anodizing the outermost portion.

31. The method of claim 29, wherein making the outermost portion harder includes heat treating the outermost portion.

32. The method of claim 29, wherein making the outermost portion harder includes quenching the outermost portion.

33. The method of claim 29, wherein making the outermost portion harder includes surface hardening the outermost portion.

34. The method of claim 33, wherein making the outermost portion harder includes flame hardening, induction hardening, or case hardening the outermost portion.

35. The method of claim 33, wherein making the outermost portion harder includes cold-working the outermost portion.

36. The method of claim 35, wherein cold-working the outermost portion includes peening, forging, stamping, or coining the outermost portion.

37. The method of claim 27, wherein rendering the first area includes forming at least part of the outermost portion from a different material than the second area.

38. The method of claim 37, wherein forming at least part of the outermost portion from a different material includes attaching a separate piece of material to an end of the outer leg of the link.

39. The method of claim 37, wherein forming at least part of the outermost portion from a different material includes applying a coating or layer to the outermost portion of the link.

40. The method of claim 27, wherein the link is formed of a non-metal material and rendering the first area more resistant to wear includes altering the non-metal material in at least part of the outermost portion.

41. The method of claim 40, wherein altering the non-metal material includes at least one of cross-linking and surface treating the non-metal material.

42. The method of claim 31, further including assembling the conveyor belt, and wherein heat treating the outermost portion of the link includes simultaneously heating a plurality of links assembled to form the conveyor belt by laying the outermost portions of the links on a heating surface and applying heat to the outermost portions.

43. A method of making a conveyor belt portion wear resistant, comprising:
- providing a rod having a free end, wherein the rod comprises an elongated portion of a rod material;
- forming a substantially U-shaped link configured to receive the rod, the link having a first leg, a second leg, and a connecting portion connecting the first leg and the second leg,
- rendering the connecting portion of the link more resistant to wear than other portions of the link by at least one of anodizing, heat treating, or forming the connecting portion of a different material than the first and second legs.

44. The method of claim 43, wherein rendering the connecting portion of the link more resistant to wear includes forming at least part of the connecting portion from a different material than the other portions of the link, and wherein forming at least part of the connecting portion from a different material includes attaching a separate piece of material to the connecting portion of the link.

45. The method of claim 43, wherein rendering the connecting portion of the link more resistant to wear includes forming at least part of the connecting portion from a different material than the other portions of the link, and wherein forming at least part of the connecting portion from a different material includes applying a coating or layer to the connecting portion of the link.

46. A conveyor belt configured to contact a drive surface, the conveyor belt comprising:
- a plurality of pitches connected by a plurality of rods and a plurality of bar links;
- wherein at least one of the plurality of bar links includes an outer surface having a first area and a second area that are spaced apart from each other, the first area defining an outermost portion of the conveyor belt:
- wherein the first area is configured to contact and face the drive surface, wherein the first area is included on a protruding portion of the link extending outward from the at least one of the plurality of bar links;
- wherein the first area is more resistant to wear than the second area.

47. The conveyor belt of claim 46, wherein the protruding portion extends from a central portion of the bar link.

48. The conveyor belt of claim 46, wherein the protruding portion extends from an end portion of the bar link.

49. The conveyor belt of claim 1, wherein the link includes an aperture;
- further comprising a connection rod that is received in the aperture and that is configured to connect the link to another link;
- wherein the first area is spaced apart at a distance from the aperture; and
- wherein the second area is disposed proximate the aperture.

* * * * *